Nov. 17, 1942.  J. D. NIXON  2,302,391
SYSTEM AND APPARATUS FOR LIFTING FLUID FROM WELLS
Filed Oct. 22, 1940  10 Sheets—Sheet 1

Inventor
JEDDY. D. NIXON
By Jack A. Ashley Jr.
Attorney

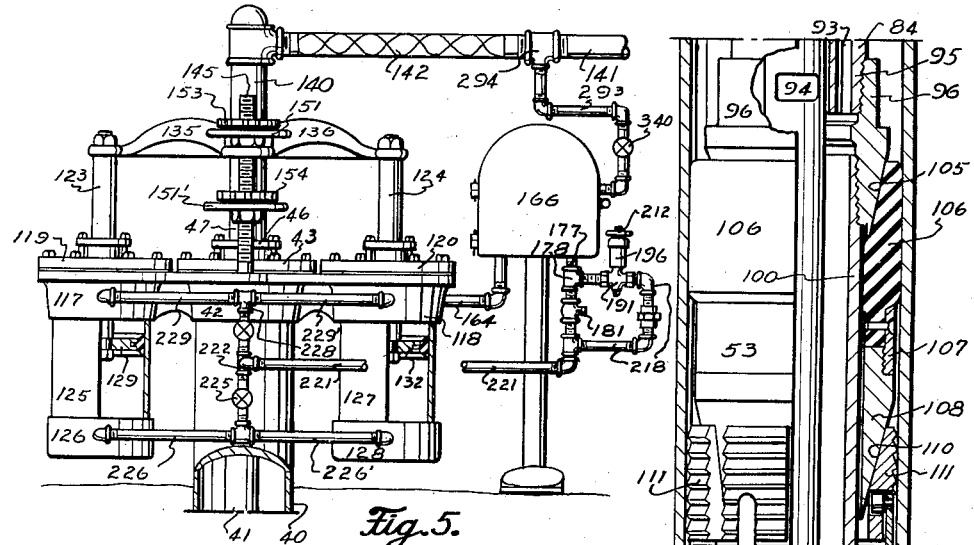
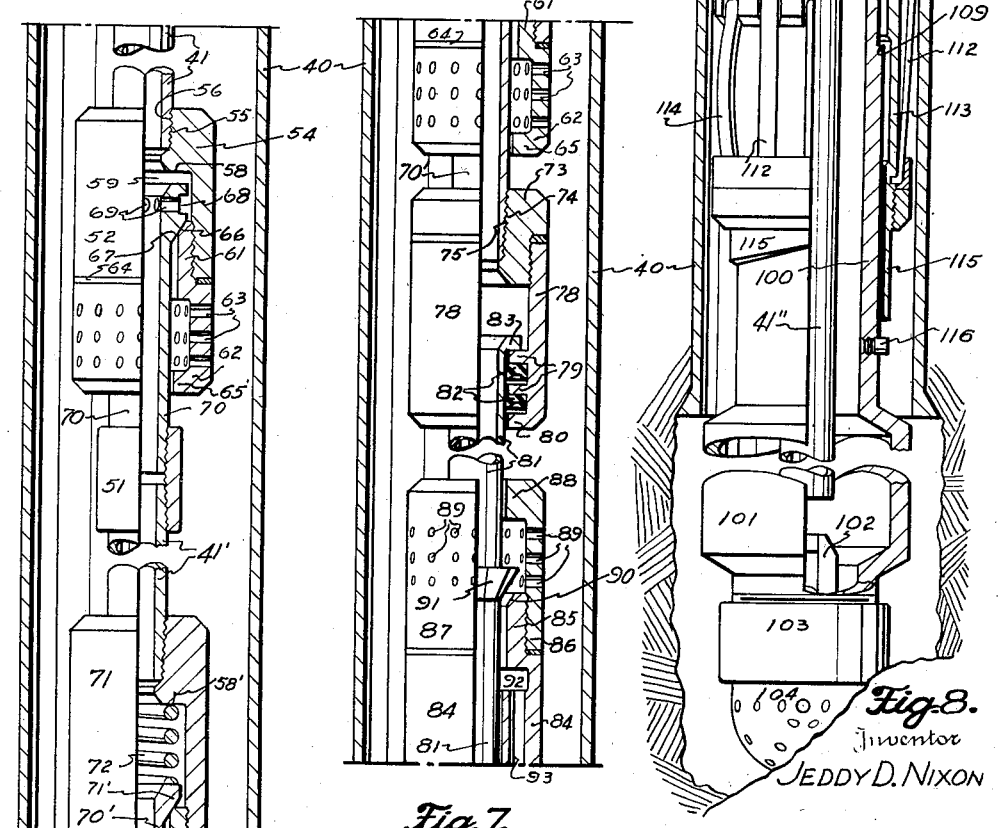
Fig. 5.
Fig. 6.
Fig. 7.
Fig. 8.
Inventor
JEDDY D. NIXON

Nov. 17, 1942.　　　　J. D. NIXON　　　　2,302,391
SYSTEM AND APPARATUS FOR LIFTING FLUID FROM WELLS
Filed Oct. 22, 1940　　　10 Sheets-Sheet 3

Inventor
JEDDY D. NIXON

Inventor
JEDDY D. NIXON
By Jack A. Ashley Jr.
Attorney

Nov. 17, 1942.  J. D. NIXON  2,302,391
SYSTEM AND APPARATUS FOR LIFTING FLUID FROM WELLS
Filed Oct. 22, 1940  10 Sheets-Sheet 5

Inventor
JEDDY D. NIXON
By Jack Ashley Jr.
Attorney

Inventor
JEDDY D. NIXON

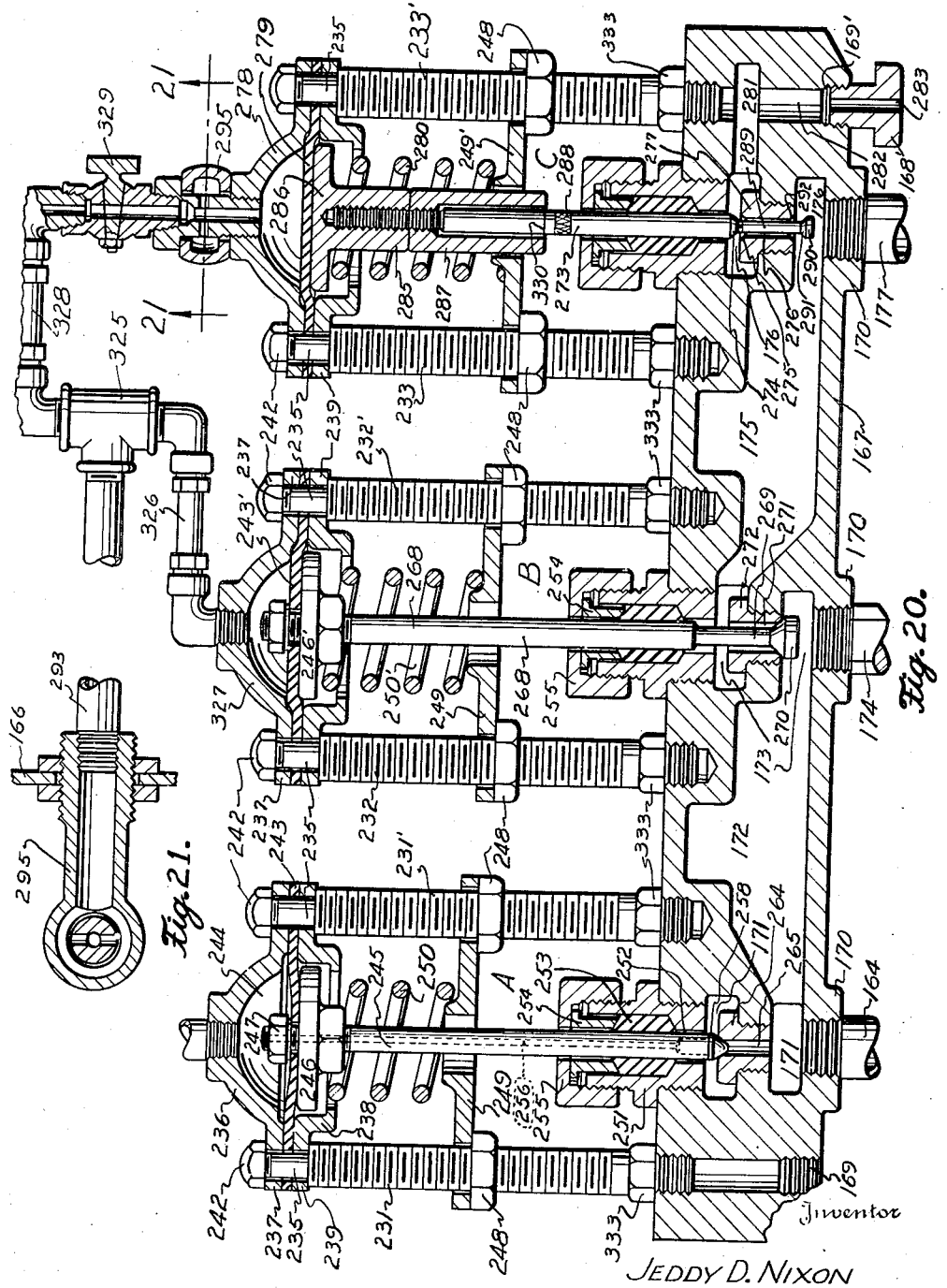

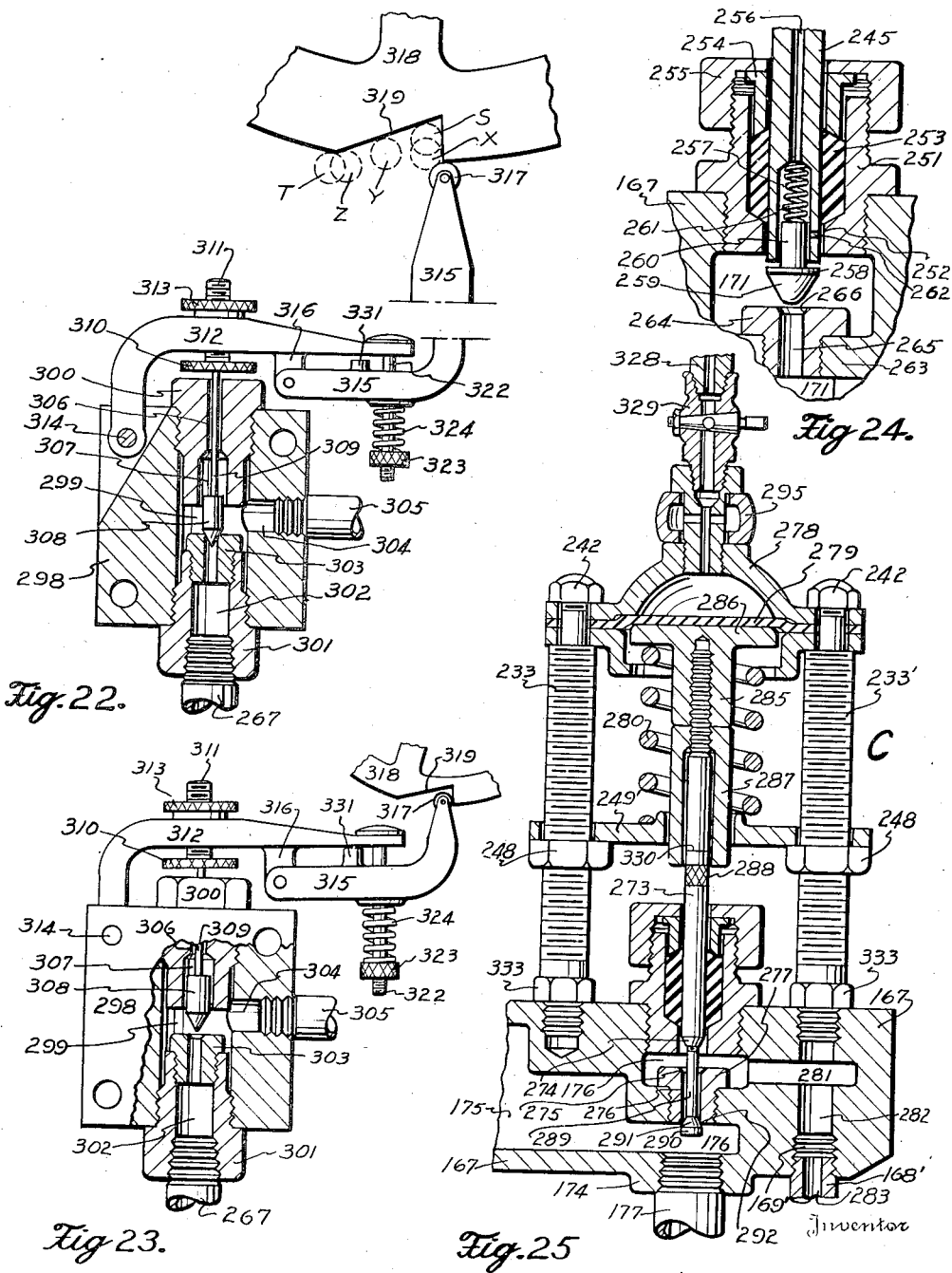

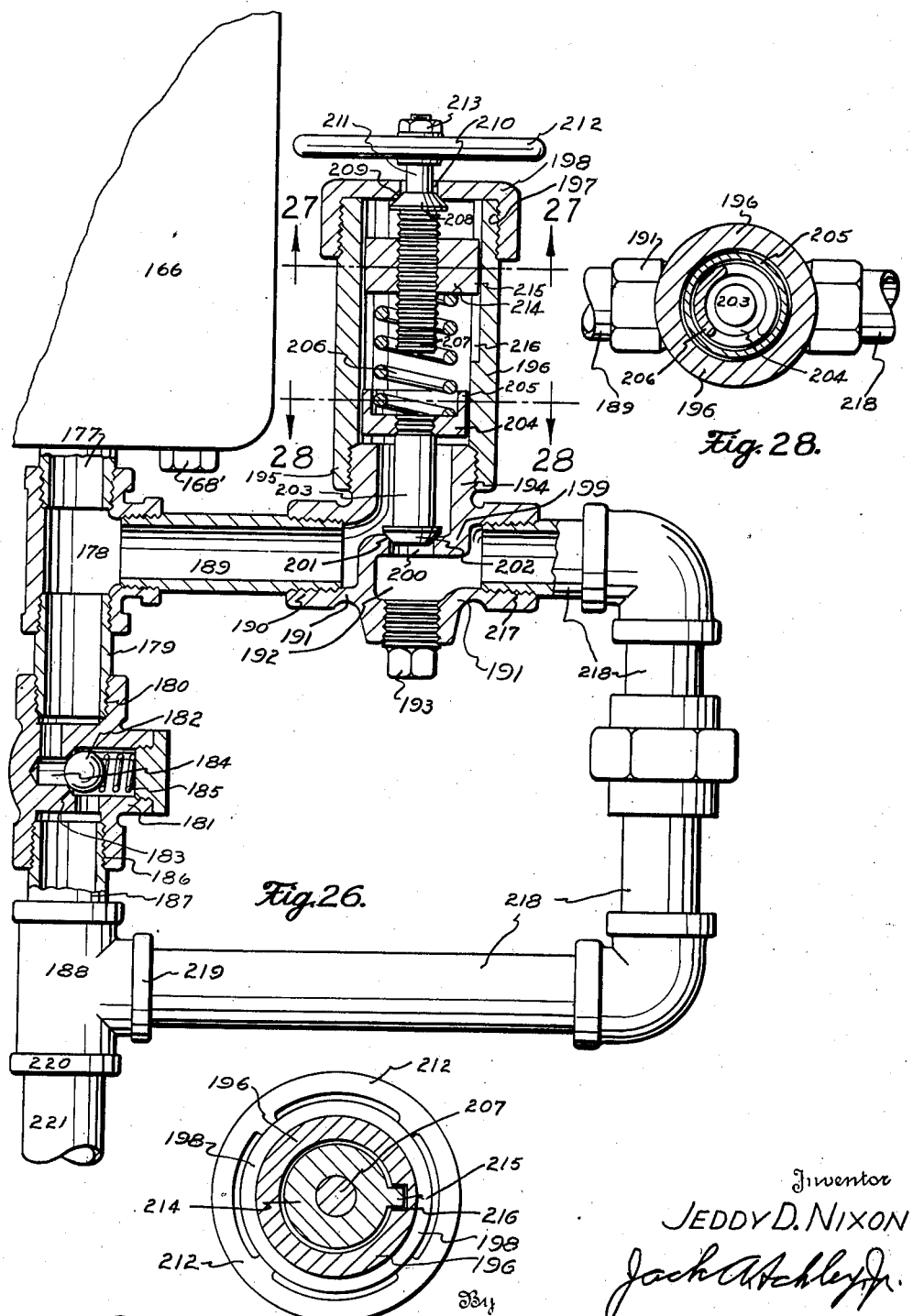

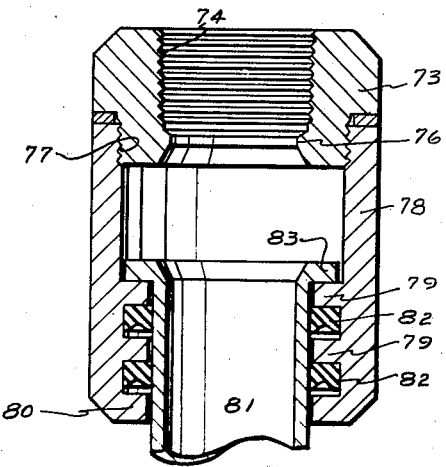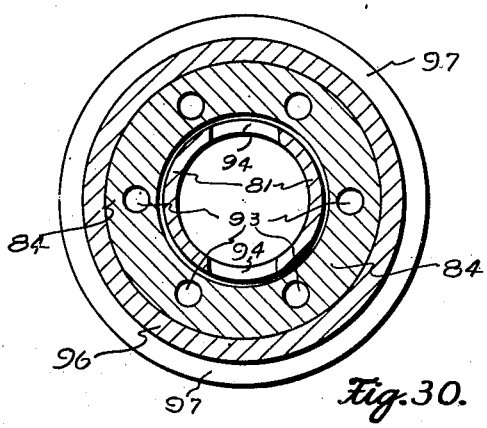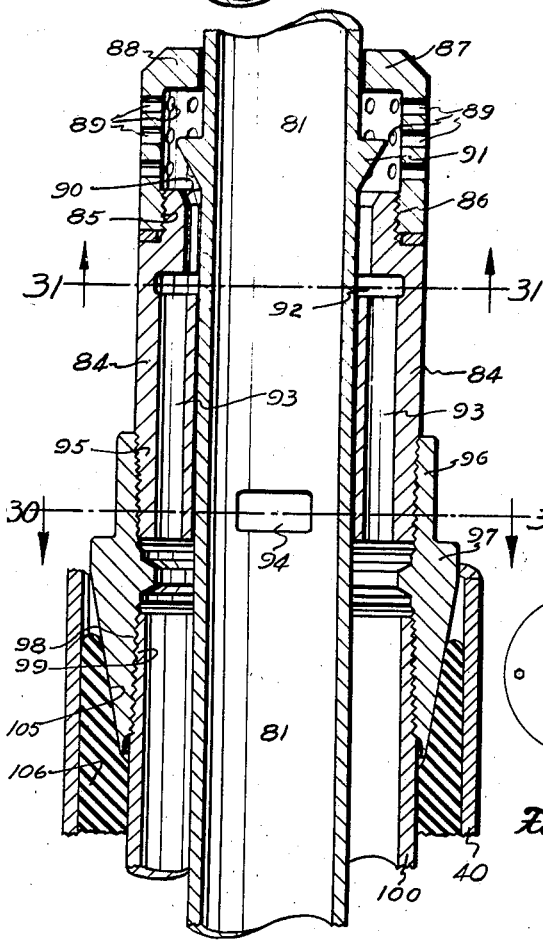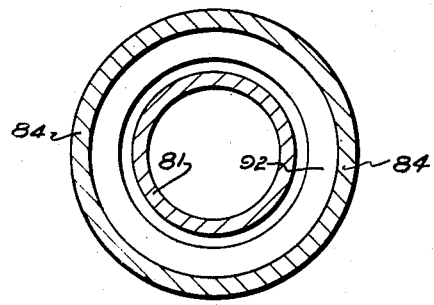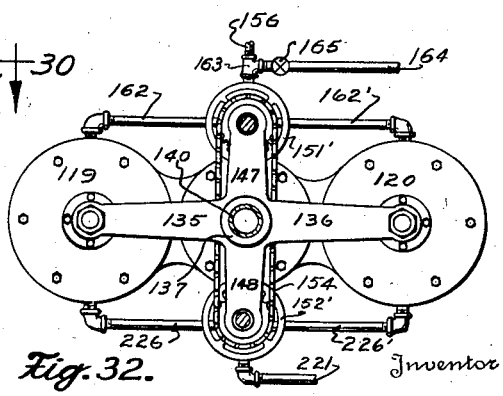

Patented Nov. 17, 1942

2,302,391

UNITED STATES PATENT OFFICE 2,302,391

SYSTEM AND APPARATUS FOR LIFTING FLUID FROM WELLS

Jeddy D. Nixon, Houston, Tex., assignor of one-half to Wilson Supply Company, Houston, Tex., a corporation of Texas Application October 22, 1940, Serial No. 362,282

20 Claims. (Cl. 103—231)

This invention relates to new and useful improvements in systems and apparatus for lifting fluid from wells.

This invention while relating to an improved well fluid lifting system and eliminating the use of a wire line, involves certain instrumentalities and features, which in some respects are improvements upon my Patents No. 2,171,478, No. 2,171,479, No. 2,202,462, and No. 2,245,005.

One object of the invention is to provide an improved well fluid lifting system which avoids the use of a wire line and the attendant difficulties encountered where such a line is used; and which also employs only a single string of tubing and the usual outer well casing, such as is now in common use on flowing and pumped wells, but wherein the usual well casing is employed as a storage reservoir for the lifting fluid which fluid may be, at all times, maintained under sufficient head pressure as to immediately exert its full force against the column of well fluid to be lifted, when such lifting fluid is admitted to the well fluid.

A particular object of the invention is to provide an improved well fluid lifting system of a highly flexible character, whereby any desired volume of the fluid produced by the well may be lifted and discharged, regardless of the depth of the well.

A further object of the invention is to provide a system of the character described which will operate efficiently and economically under substantially any feasible pressure, which may be available or which may be produced artificially; also under substantially any condition or requirement, so far as is now known, thus assuring successful and profitable fluid lifting.

Another object of the invention is to provide an improved system of the character described whereby lifting fluid-admission valve elements which project into and partially obstruct the well tubing are eliminated and wherein lifting fluid-admission valves may be employed, which, while providing a full and free flowing opening, do not in any way obstruct the flow space or bore of the well tubing, thus assuring a flow tubing which has its full cross-sectional area free of obstruction throughout its length, thus not only providing adequate upstream flow for the free gas, and full tubing capacity for the elevated column of well fluid, but permitting up and down passage of tools as in the ordinary tubing string now in common use.

An important object of the invention is to provide an improved system of flowing wells which includes a single string of tubing having independently movable sections and lifting fluid admission valves associated therewith, whereby the tubing string may be manipulated from the surface for selectively opening and closing said valves and for positively controlling the flowing of the well.

A further object of the invention is to provide an improved system of flowing wells which includes a plurality of valves mounted in the tubing so arranged that upon movement of the tubing in one direction, part of the valves are operated and upon movement of the tubing in the other direction, other of the valves are operated, whereby a more positive control and operation of a number of valves is obtained and any one of the series of valves may be opened and closed as desired.

Another object of the invention is to provide an improved system of flowing wells which includes a single string of tubing including lifting fluid valve means and carrying a packer, together with mechanically actuated means at the surface for moving said tubing to open and close said valves.

It is an important object of the invention to provide an improved well fluid lifting system which while vertically actuating the usual well tubing does so to perform each lifting fluid admission and flowing step, and this tubing moving operation is carried out by mechanical means, thus avoiding manual manipulation and the attendant uncertainties thereof and providing for more accurate and reliable actuation for each admission and flowing step.

A further object of the invention is to provide an improved well fluid lifting system which is simple and efficient and the control and regulation thereof is positive to accommodate the various requirements presented, whereby the well operator by making a few simple adjustments in the field may control the operation of the system, as desired, or as becomes necessary, so that the opening of the desired valve from which the well fluid will be produced may be readily controlled.

Another object of the invention is to provide an improved well fluid lifting system that has a timing mechanism for controlling the time and length of actuation for admitting lifting fluid to the well fluid, so constructed that the regulating of the time of admission as well as the length of time may be easily made by the usual well operator, whereby the necessary adjustments may be readily made to handle the well fluid lifting requirements.

Still another object of the invention is to provide an improved system of controlling the lifting of well fluid from the producing level of a well to the surface that has means for admitting a portion of lifting fluid from a source to the well fluid to lift the same which means is operated from the well surface for controlling the point of introduction of said lifting fluid admitting means, together with means on the surface for regulating the operation of said surface controlling means, whereby the admittance of lifting fluid to said well fluid is controlled.

It is a particular object of the invention to provide an improved intermittently actuated control mechanism which is so arranged that the duration of admission of lifting fluid may be controlled by a timing mechanism, or by the flow of the well fluid per se, whereby a control mechanism is provided which will handle all well flowing conditions and requirements economically and satisfactorily.

Still another object of the invention is to provide an improved system of controlling the flow of well fluid that has means for admitting lifting fluid from a source to the well fluid to lift the same, which means is operated from the well surface for controlling the admittance of the admitted lifting fluid to said well fluid, together with means actuated by said controlling means for flowing said well fluid from below the point of admission of said lifting fluid.

A further objection of the invention is to provide an improved system of producing or lifting fluids from a well under varying flowing conditions and involving an improved intermittent fluid control mechanism connected to a supply of pressure fluid and means in the control mechanism for by-passing a low pressure actuating fluid to control the supply of pressure fluid to the actuating mechanism, together with timing means for the controlling mechanism, whereby the operation of the actuating mechanism is controlled for admitting lifting fluid to the well fluid. Also, means are provided in said control means for releasing the pressure fluid from the actuating mechanism to cut off the supply of pressure fluid thereto and this releasing means is so arranged as to be actuated either by the flowing pressure of the well fluid or by the timing mechanism.

Still another object of the invention is to provide an adjustable by-pass means in the releasing means of an intermittent control mechanism which may be so regulated as to maintain a predetermined back pressure on the actuating mechanism to conserve pressure fluid and to control the positioning of said actuating mechanism.

A further object of the invention is to provide an improved control mechanism for the actuating mechanism which is so constructed that the length of time the flow valves are held open is regulated and the length of time said flow valves are held closed also is regulated, whereby a positive control of the operation of said flow valves is had.

A construction designed to carry out the invention will be hereinafter described, together with other features and objects of the invention.

The invention will be more readily understood from the following specification and by reference to the accompanying drawings, in which an example of the invention is shown, and wherein:

Figure 5 is a view similar to Figure 1, showing the control and actuating mechanism in another operating position;

Figure 6 is a view similar to Figure 2 and is a continuation of Figure 5;

Figure 7 is a view similar to Figure 3 and is a continuation of Figure 6;

Figure 8 is a view similar to Figure 4 and is a continuation of Figure 7, the packer being set;

Figure 20 is a longitudinal, vertical sectional view of a portion of the operating mechanism of the intermittent control mechanism;

Figure 21 is a horizontal, cross-sectional view taken on the line 21—21 of Figure 20;

Figure 22 is an enlarged sectional view of the time controlled valve for regulating the actuation of the control mechanism, showing said valve in its closed position; together with a portion of the escapement wheel and various operating positions of the roller which are indicated in dotted lines;

Figure 23 is a view, partly in section and partly in elevation, of said time controlled valve in its open position;

Figure 24 is an enlarged, transverse, vertical sectional view of the lower portion of the regulator valve of the control mechanism, shown in an open position;

Figure 25 is a transverse, vertical sectional view of the release valve of the control mechanism, showing said valve to be actuated by the pressure of the flowing well fluid;

Figure 26 is an enlarged view, partly in elevation and partly in section, of the check valve and pressure equalizing or by-pass valve mechanism connected into the line leading from the intermittent control mechanism to the actuating mechanism;

Figure 27 is an enlarged, horizontal, cross-sectional view taken on the line 27—27 of Figure 26;

Figure 28 is a similar view taken on the line 28—28 of Figure 26;

Figure 29 is an enlarged, vertical sectional view of the bottom hole valve showing the details thereof, in an open position;

Figure 30 is a horizontal, cross-sectional view taken on the line 30—30 of Figure 29;

Figure 31 is a similar view taken on the line 31—31 of Figure 29; and

Figure 32 is a horizontal, cross-sectional view taken on the line 32—32 of Figure 16.

Figure 13:
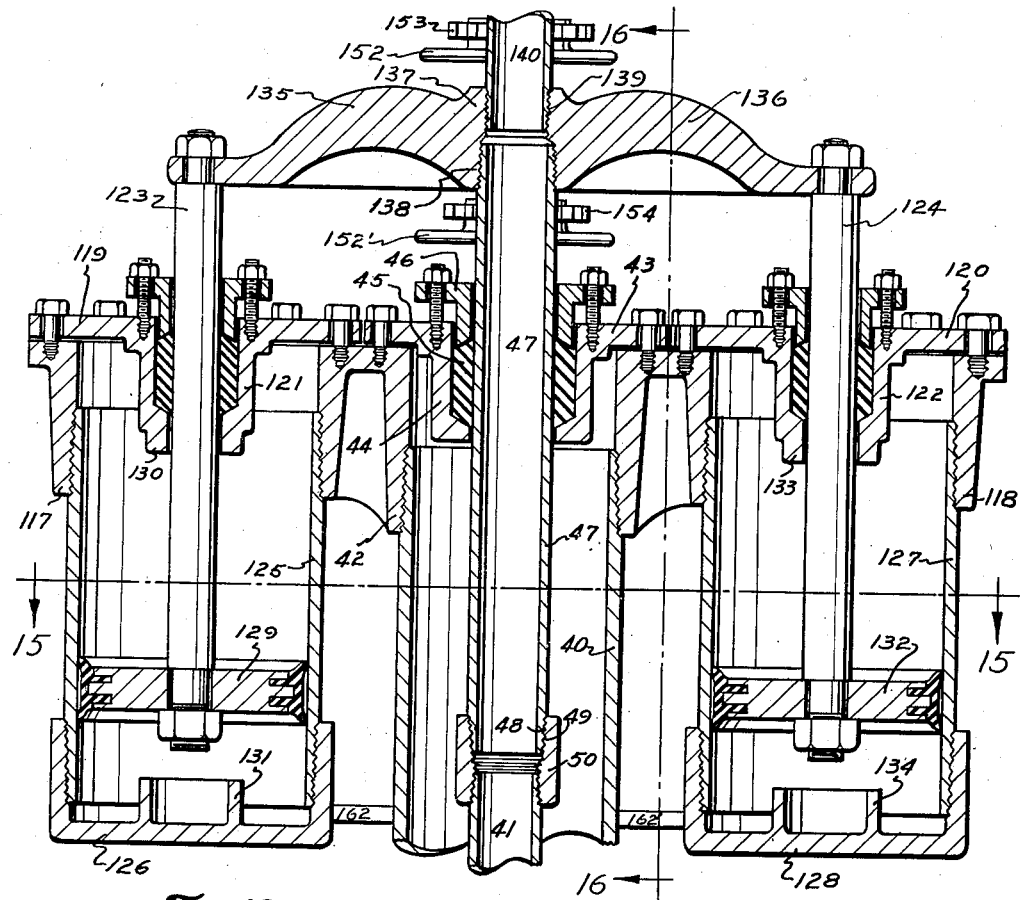
Figure 13 is an enlarged, vertical, cross-sectional view of the actuating means of the surface actuating mechanism.
Figure 14:
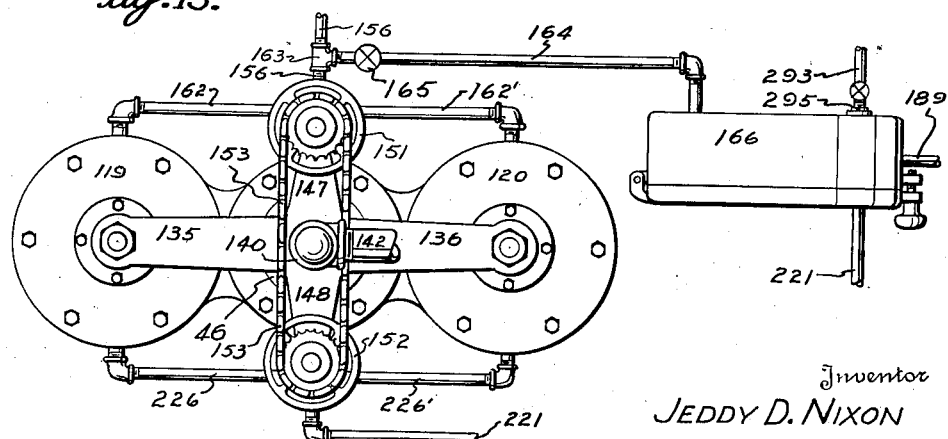
Figure 14 is a plan view of the surface actuating mechanism and control means.
Figure 15:
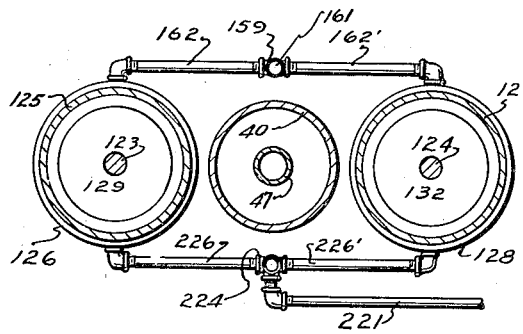
Figure 15 is a reduced horizontal, cross-sectional view taken on the line 15—15 of Figure 13.
Figure 17:
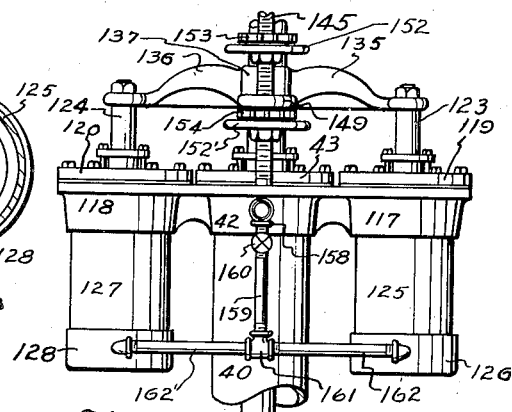
Figure 17 is a side elevation of the actuating mechanism showing the opposite side from Figures 1, 5 and 9.

In the drawings the numeral 40 designates the usual well casing, which has a well tubing string 41 depending axially therethrough. The upper end of the casing is screwed into a casing head 42, as is best shown in Figure 13, and an annular cover or cap 43 therefor is bolted upon the upper face of the casing head 42. This cap is provided axially with a suitable stuffing box recess or chamber 44 for receiving packing means 45; and an annular follower ring or hold-down block 46 is bolted onto the upper surface of said cap 43. A relatively short, tubular polish member or rod 47 is slidably mounted in said stuffing box 44 and the lower end of said member is provided with an externally screw-threaded pin 48 for engaging in the threaded box 49 of a connecting collar 50, which collar receives the upper end of the tubing string 41 for supporting and actuating the same.

The tubing string 41 may extend substantially the full length of said casing 40, and its lower end may terminate within the lower portion of said casing, or it may extend below said casing to within a short distance of the bottom of the well, or any distance below the lower end of said casing as required. It is to be noted that the tubing string is substantially continuous and, as will hereinafter be pointed out, is free from internal obstructions so that its full flowing capacity and cross-sectional area are available for flowing the well fluid. A suitable liner (not shown), either perforated or plain, may be provided on the lower end of said casing, if desired; or the lower portion of the well bore below said casing may be open or uncased, as shown in the drawings.

The tubing string 41 is preferably provided with a number of flow or kick-off valves 52 intermediate its ends and in spaced relation to the standing fluid level of the well, as pointed out in my above-mentioned patents and co-pending applications. These valves serve to lower the well fluid level in said casing 40 and said well tubing 41 down to the point or level at which it is desired to operate or produce the well. There may be only one kick-off or flow valve mounted in said tubing string, or any number necessary to accomplish the desired results.

In some instances, one of these kick-off valves, or substantially the same, is used as a flow or operating valve, but in other wells where it becomes necessary to produce said well fluid at a point below the end of said casing string; or in a liner, if used; or below a perforated portion of said casing string; the usual kick-off valve 52 may not be used at this point. Therefore, under such latter conditions, it is necessary, to shut off or set a packer 53, preferably of my own construction and similar to that shown in my Patent No. 2,171,479, although any suitable packer or other seal-off device may be used. It is preferred to connect the packer 53 to said tubing string and to set said packer as low in said casing string as is possible, in accordance with the position of a liner (not shown), or of the above-mentioned perforations in a liner or the casing (both of which are not shown), all being subject to variations as conditions may warrant.

The construction of these kick-off valves includes an elongated, external cylindrical collar 54 (Figure 18) having its upper edge externally beveled to facilitate travel through said casing and through any well fluid. The upper end of this collar is provided with an internally screw-threaded box 55 for receiving an externally screw-threaded pin 56 on the lower end of a section of the tubing 41 which said valve is to be connected. The axial bore of said collar 54 is provided with an inwardly directed, annular guide rib 57, the inner diameter of which is substantially the same as the inner diameter of said tubing string 41. It will be seen in Figures 2, 6 and 18, that the upper and lower edges of said rib 57 are beveled or tapered to facilitate the passage of tools through said tubing string and said rib.

The collar 54 is counterbored at the lower edge of the lower face of said guide rib 57, so as to form a broad, annular shoulder 58. The lower end of this counterbore 59 is provided with an internally screw-threaded box 60 for receiving an upstanding, externally screw-threaded, tubular pin 61 on the upper end of a cylindrical thimble 62 having a band or ring of radial perforations 63 intermediate its ends. The upper end of said pin 61 is provided with an internal, annular, ground seat 66. A relatively soft metal packing or sealing ring 64 is interposed between said collar thimble 54 and 62, so as to form a seal or fluid-tight joint. The lower end of the thimble 62 is inturned to form an annular flange 65, which has a snug sliding fit or engagement with the external surface of said tubing string 41.

A mandrel 70, which may be a short section of tubing, has its lower end screw-threaded into a coupling collar 51 of the section 41' of the tubing string, whereby said mandrel supports said latter section. The mandrel extends up through the thimble 62 into the counter bore 59. The upper end of the mandrel is upset to form an enlarged annular head 67' which is provided with an overhanging beveled valve face 67 for co-acting with the annular seat 66, whereby the mandrel is suspended when said face is seated. The head above the valve face is formed with radial ports or perforations 69 opening into an annular recess 68 formed in the outer annular surface of said head. The upper end of the bore of said mandrel 70 is beveled complementary to the lower edge of said guide rib 57, so that when the upper end of said upset portion of said mandrel is abutting the shoulder 58, a substantially continuous passageway is formed from said mandrel through said rib.

Figure 1:
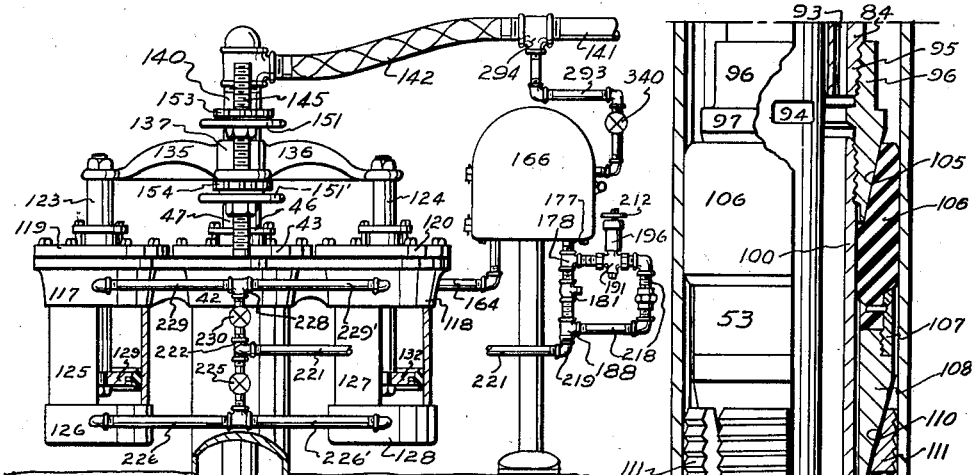
Figure 1 is a side elevation of the above-ground control and actuating mechanism of well fluid lifting system, constructed in accordance with the invention and showing such mechanism in one operative position.
Figure 2:
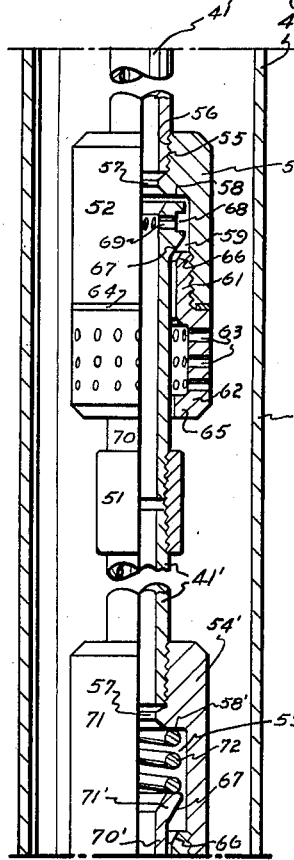
Figure 2 is a view, partly in section and partly in elevation of a section of the underground structure and is a continuation of Figure 1.
Figure 3:
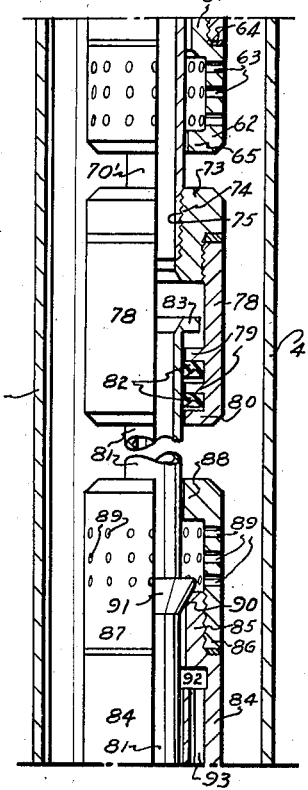
Figure 3 is a similar view and is a continuation of Figure 2.
Figure 4:
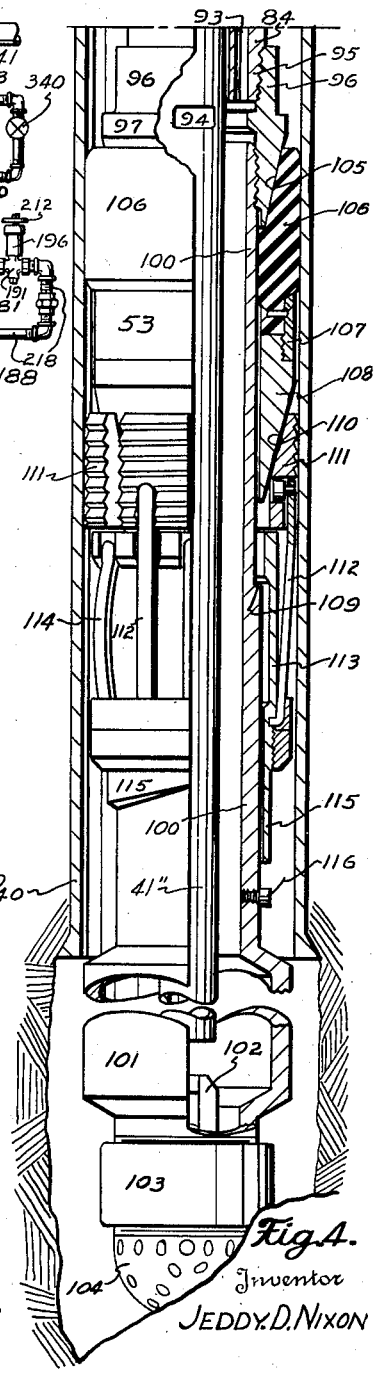
Figure 4 is a view, partly in section and partly in elevation, and is a continuation of Figure 3 showing the packer set or expanded.
Figure 9:
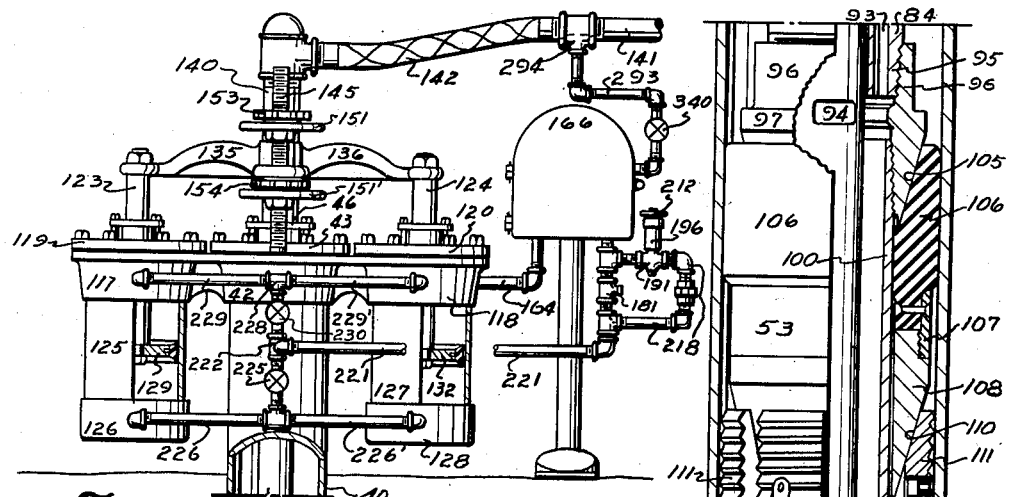
Figure 9 is a view similar to Figure 1, and showing another operating position.
Figures 16, 18:
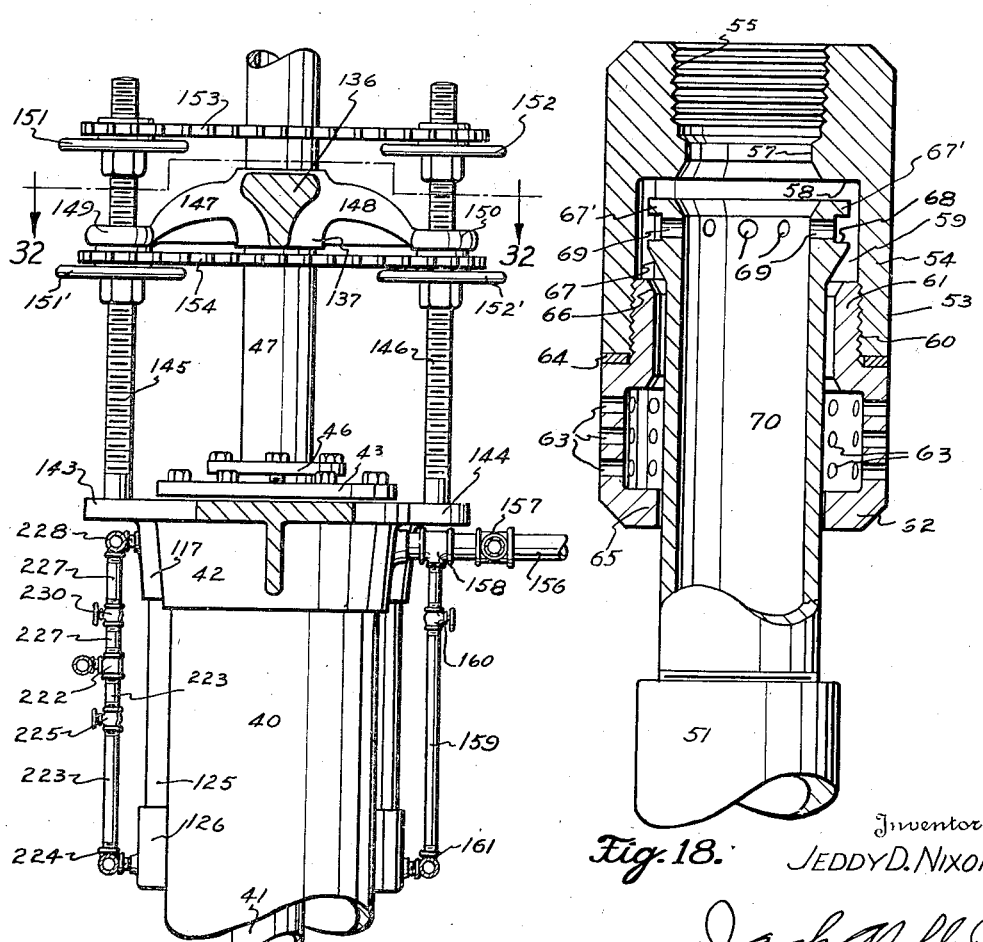
Figure 16 is a transverse, vertical sectional view taken on the line 16—16 of Figure 13.
Figure 18 is a transverse, vertical sectional view of one of the kick-off valves.

Attention is called to the fact that the inner diameter of said pin 61 is considerably larger than the external or outside diameter of said mandrel 70, whereby an ample annular fluid passageway is provided therebetween, so that when said mandrel is in its upper or open position, as shown in Figures 2 and 18, fluid may flow from the casing 40, through said perforations 63, into the collar 62, through the pin 61, into the counterbore 59, through the ports 69 and into the bore of the mandrel 70 and the tubing string 41. It will be seen that when the tubing string 41, which carries the valve 52, is lifted or raised, the valve member 67 will engage the seat 66 and close off this flow passage, as well as to pick up and support the tubing string section 41' below said valve 52. Whenever said tubing string 41 is lowered, the valve seat 66 will be moved away from its face 67 to open this passage for the flow of fluid, and the head 67' of said mandrel 70 will move approximately to the position shown in Figures 2 and 18, or until the upper end of said head engages said shoulder 58.

As many of this type of kick-off valves may be connected in said tubing string as may be required for the particular installation and these other kick-off valves will be substantially the same. However, the lowermost kick-off valve may be substantially the same, as has been described for the valve 52, but it is preferred that this valve 71 (Figures 2, 3, 6 and 7) be slightly different in that a spring 72 is mounted upon the upper end of the upset head 71' of the mandrel 70' and the upper end of this spring abuts the shoulder 58'. Of course, the perforations 69 and the channel or recess 68 are not needed, so that the upset head of this type of valve 70 is not as thick or long as in said valve 52; however, the seat 66 and valve face 67 are employed.

It is preferred that where a valve is to be installed for lifting well fluid from below said packer or seal-off device 53, that a slightly different form of valve be used known as a bottom hole valve and that this valve usually be mounted as close to said valve 71 as is possible. A cylindrical collar 73 (Figures 3, 7, 11 and 29) is provided at the upper end of said bottom hole valve and this collar is provided with an internally screw-threaded box 74 for receiving the externally screw-threaded pin 75 on the lower end of said mandrel 70' or tubing forming this mandrel for said valve 71 to connect said valve into said tubing string. The lower end of this box is provided with an annular guide rib 76, similar to said guide rib 57 and is provided for the same purpose. The lower end of said collar 73 is provided with an axially depending, externally screw-threaded pin 77 for receiving an elongated, cylindrical thimble 78. It will be noticed that the bore of this thimble is considerably larger than the bore of said tubing 41.

The lower portion of the bore of this thimble is formed with a number of inwardly directed, spaced ribs or rings 79, and the lower end of said thimble 78 has an inturned flange 80, similar to the flanges 65 of the other valves. The upper end of the section of tubing 41 forms a mandrel 81 telescoping with said thimble 78, so as to have a sliding engagement with the inner faces of said ribs 79 and flange 80, whereby the recesses formed between said ribs 79 and said flange 80 may be filled or provided with suitable annular packing rings 82 for sealing around said mandrel 81 and preventing the passage of fluid along said mandrel into said thimble 78. The upper end of said mandrel 81 is upset to form an annular flange or head 83 which overhangs and engages the uppermost ring 79 to prevent the separation of said mandrel 81 and thimble 78. The upper end of the bore of said mandrel 81 is beveled, the same as the bores of said mandrels 70 and 70' of the other valves 54 and 71 and for the same purposes.

This upper section composed of the collars 73 and thimble 78 is spaced from the lower section which comprises an elongated, cylindrical body 84, having an axial, upstanding, annular pin 85 thereon for engaging in the internally screw-threaded box 86 of a cylindrical cap or collar 87.

The upper end of this cap 87 is formed with an inturned flange 88 similar to the flanges 65 and 80, and this flange 88 has a snug sliding engagement with the tubular mandrel 81. This cap 87 is provided intermediate its ends with a band or ring of perforations 89. The inner diameter of the pin 85 is larger than the outer diameter of the mandrel 81, so that an ample annular flow passage is formed therearound. The upper end of the bore of said pin 85 is beveled to form an annular seat 90 and the mandrel 81 is externally upset and beveled to form an annular valve member 91 thereon to co-act with said seat 90 to close the passageway through said pin 85.

The bore of the body 84 is counterbored at 92 to form a manifolding chamber or channel from said passageway in said pin 85 to a plurality of longitudinally extending ducts or passageways 93, which extend from said chamber 92 to the lower end of said body 84. As will be noticed in Figures 3, 4, 7, 8, 11, 12 and 29, said mandrel 81 has a tight sliding fit within the bore of said body 84. When said mandrel is in its lower position, so that said valve member 91 is engaging the seat 90 (Figures 3, 4, 11 and 12), one or more slots or ports 94 cut in said mandrel 81 are adjacent the lower edge of said body 84. When in this position, free well gas may flow therethrough and into said tubing while the well fluid is accumulating prior to being lifted.

The lower end of said valve body 84 is formed with an externally screw-threaded pin 95 for engaging within an internally screw-threaded box of a cylindrical, upstanding collar 96. This collar is formed on the upper end of an annular head or cap 97 of said packer 53 and the lower end of this head 97 is provided with an internally screw-threaded box 98 for receiving an externally screw-threaded pin 99 on the upper end of a tubular mandrel 100. This mandrel extends through said packer and supports the same when in its unexpanded position (not shown). The lower end of said mandrel 100 is extended down within the well to the point where a larger pipe is swedged thereon to form a fluid accumulating chamber 101.

This chamber is as long as is necessary in accordance with the well conditions and at its lower end is connected to the usual standing or foot valve 102 which is connected into the upper end of a collar 103. This collar has on its lower end a suitable screen or perforated bull plug 104, whereby well fluid may flow through the perforations of said bull plug 104 through said standing valve 102 and into said chamber 101. The mandrel 81 is continued downwardly and is connected into a lower section of the tubing string 41" by suitable collars (not shown), and the lower end of this tubing string extends down into said chamber 101 to within a relatively short distance of said standing valve 102.

The outer surface of the lower portion of said head 97 is tapered downwardly, so as to form an expanding surface or member 105 for engaging within and expanding the packing member or sleeve 106. This packing sleeve 106 is riveted or clamped at its lower end to a narrow band or ring 107 that is threaded upon, or otherwise suitably fastened to the upper end of an elongated, cylindrical collar 108. As will be noticed from Figures 4, 8 and 12, said packing sleeve 106 and said collar 108 are slidably mounted on said mandrel and are free to move on said mandrel 100 between said head 97 and an external shoulder 109 formed on said mandrel 100 intermediate its ends. The lower portion of the outer surface of the collar 108 is tapered downwardly, so that an annular, inclined, guide surface 110 is presented for a plurality of suitable gripping slips 111 to co-act therewith. The slips are arcuate in cross-section, so as to conform to the inclined guide surface 110 and when said slips ride up on said surface, they will be wedged between said surface of said collar 108 and said casing 40, whereby a gripping action takes place and further downward movement of said collar and packing member 106 is prevented. When this occurs, the tapered expanding surface 105 will engage and enter the upper end of said packing sleeve 106 to compress and expand said sleeve into its packing or sealing position to form a fluid-tight seal at this point in said casing string 40.

The slips are mounted on the upper end of flat spring arms 112, the lower ends of which are removably fastened to a cylindrical supporting or friction cage 113. This cage has a sliding fit on the mandrel 81 adjacent the lower ends of said slips and a plurality of suitable friction or leaf springs 114 are mounted on said cage 113, so as to form the usual friction cage on practically all hook-wall type of packers. The lower end of said cage 113 is provided with a depending, annular skirt 115, in which is formed the usual bayonet or J slot (not shown). The lower edge of said skirt is so inclined that a stud or pin 116 on the mandrel 81 will be led into this slot to lock said cage in its lowermost or inactive position and prevent the accidental setting of said slips 111 and expanding of said packing sleeve 106.

The casing head 42 has connected thereto and preferably made integral therewith a pair of annular hangers or bowls 117 and 118, one on each side of said casing head diametrically opposite the other. Each of these hangers is provided with a flat, annular cover or cap 119 and 120 respectively, bolted thereto that are similar to said cap 43 for said casing head 42. Also, each cap is provided with a stuffing box or chamber 121 and 122, that are similar in construction to said stuffing box 46. The stuffing box 121 has a piston rod 123 extending axially therethrough and the stuffing box 122 has a similar piston rod 124 extending axially therethrough. The bowl 117 has a short cylinder 125 depending therefrom with a bottom cap or collar 126 threaded onto its lower end for closing the lower end thereof and a similar cylinder 127 is threaded onto the lower end of said bowl 118 with a bottom cap or collar 128 on its lower end. The piston rod 123 has a piston 129 mounted on its lower end and adapted to reciprocate within said cylinder 125 with the lower end of said stuffing box 121 serving as an upper stop 130 and a short shallow cup or annular ring 131 extending up from said cap 126 to form a lower stop, whereby the upward and downward travel of said piston 129 and piston rod 123 are limited in their travel to the confines of said cylinder 125. The cylinder 127 has a similar structure, such as a piston 132, an upper stop 133 and a lower stop 134.

The upper end of the piston rods 123 and 124 are connected together respectively by cross-arm members 135 and 136 and these arms are mounted centrally on a collar 137. This collar is provided with an axial bore with an internally screw-threaded box 138 in its lower end for receiving the threaded upper end of said polish rod 47 for supporting and actuating said polish rod. It is pointed out in Figure 13 that, when said pistons 129 and 132 are moved, said tubing string 41 is moved therewith accordingly.

The upper portion of the bore of said collar 137 is also formed with an internally screw-threaded box 139 for receiving a threaded pin on the lower end of a flow line connection or sub 140. This sub 140 is connected to the usual well fluid flow line 141 by a short piece of a suitable flexible connection or pipe 142.

The casing head 42 is provided with a pair of radial, horizontally extending ears 143 and 144, diametrically opposite each other and at right angles to said cylinders 125 and 127 and said cross arms 135 and 136. These ears each have an upstanding, elongated bolt or screw 145 and 146 respectively, mounted thereon. The central collar 137 on said cross arms 135 and 136 is also formed with a shorter pair of cross arms 147 and 148, diametrically opposite each other and at right angles to said cross arms 135 and 136. The outer ends of these arms 147 and 148 are each formed with an eye 149 and 150 respectively. These eyes encircle said threaded bolts 145 and 146 respectively, for guiding and steadying said cross arms 135 and 136 and said polish rod 47, as well as to control the movement of said pistons 129 and 132, as will be described later.

A pair of hand wheels 151, 151' are threaded on said bolt 145 and a pair of hand wheels 152, 152' are threaded on said bolt 146. As will be noticed one hand wheel of each pair 151' and 152' are beneath said eyes 149 and 150 and one of each pair 151 and 152 are above said eyes. Each hand wheel has made integral therewith a gear, in order that suitable chains 153 and 154 may be placed thereon, so as to gear the hand wheels beneath said ears together and the hand wheels above said ears together, whereby each set of hand wheels 151, 152 and 151', 152' become a unit and operate in unison. With this structure, it would be impossible for either of said hand wheels thus geared or linked together to be screwed up or down more than the other on said threaded bolts 145 and 146 and prevent an uneven slant to be given to said ears 149 and 150. The purpose of these hand wheels is to serve as adjustable stops to control and limit the up and down movement of said ears 149 and 150 and consequently said tubing string 41. The exact purpose and function of said hand wheels will be more fully explained and described hereafter in the specification.

The casing head 42 is provided with an inlet port into which is connected a pipe 156, which may be the usual field pressure supply line, or a line from any suitable source of pressure fluid to supply said casing 40 with a reservoir of pressure fluid, as well as to supply an operating fluid for the control mechanism, as will be described later. This pipe 156 has a manually operated, gate valve 157 connected therein near said casing head 42. A T 158 is connected in said pipe 156 between said casing head and said valve 157 for connecting an upright, distributing pipe 159 to said pipe 156. This pipe 159 has a manually operated, gate valve 160 connected therein intermediate its ends and the lower end of said pipe 159 terminates in a T 161, that has connected thereto a pair of manifold pipes 162 and 162'. These manifold pipes 162 and 162' extend one from each side of said T 161 to said lower caps 126 and 128 of said cylinders 125 and 127 respectively, whereby it will be seen that should said valve 160 be opened, the full pressure from said pipe 156 will be distributed to said cylinders 125 and 127 beneath said pistons 129 and 132 therein.

This pipe 156 also has a T 163 connected therein on the other side of said valve 157 from said T 158 and 164 is connected to this T 163. A manually operated, gate valve 165 is connected in said pipe 164 and preferably near said T 163, although the location of this valve in this pipe is immaterial to the operation of the invention and may be located where desired. This pipe 164 extends from said T 163 to a suitable housing 166. This housing comprises a water-tight, dust-proof enclosure for the intermittent control mechanism, which mechanism controls the flow of a pressure fluid to the pistons 129 and 132, as will be described.

Figure 19:
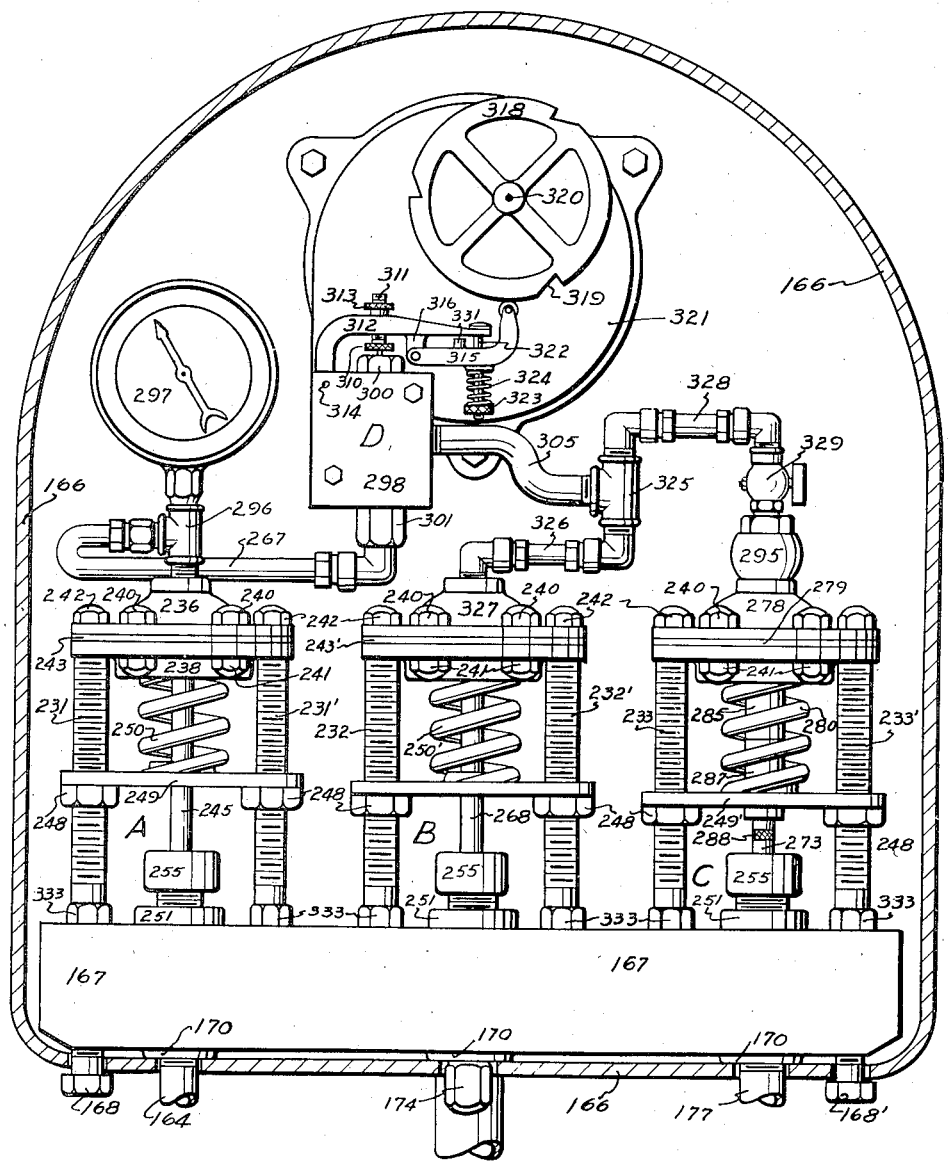
Figure 19 is a view, partly in section and partly in elevation, of the intermittent control mechanism and its housing.

As will be seen in Figure 19, an elongate, rectangular body 167 is mounted in the lower portion of said housing 166 and is suitably fastened to said housing by one or more stud bolts 168 and 168' engaging respectively in threaded sockets 169 and 169', one on each end of said body. This body is spaced from and held rigid in said housing 166 by flat bosses 170 spaced along the lower edge of said body 167 between said bolts 168 and 168'. The purpose, function and operation of the intermittent control mechanism positioned within said housing 166 and mounted upon and within said body 167 is very similar to the intermittent control mechanism shown in my Patents No. 2,171,478, No. 2,245,005, and No. 2,245,003. While the mechanism shown in this patent and in these applications may be used with this invention, in most instances on certain types of wells, I prefer to use the structure shown and described for Figures 19, 20, 21, 22, 23, 24, 25, 26 and 28.

The pressure fluid supply pipe 164 is threadably connected into the lower end of a vertical port or passageway 171 extending transversely through said body 167 from its lower edge to its upper edge. This port 171 is connected to one end of an elongated, horizontally extending passageway 172 lying longitudinally of said body 167 and which terminates in a vertical port or passageway 173, similar to said port 171. This port 173 extends from the upper edge of said body to the lower edge of said body, but does not extend below the bottom of said passageway 172, as a removable, clean-out or drain plug 174 is threaded into the lower end of said port 173. One end of an elongated, horizontally extending passageway 175, similar to said passageway 172, is connected to said vertical port 173 intermediate its ends and above where said passageway 172 terminates in said port 173, so that said port extends transversely of the ends of said passageways 172 and 175 and forms a communication therebetween. The other end of said passageway 175 terminates in a vertical, transverse port or passageway 176, similar to said port 171. The lower end of said vertical port 176 has a pipe 177 threadably connected therein, the same as said pipe 164 in said vertical port 171. This pipe 177 extends out of said housing 166 (Figure 19) to one leg of a T 178, as will be seen in Figures 1 5, 9 and 26.

Another leg of the T 178 has a short nipple 179 connected therein, the other end of which is threaded into an internally screw-threaded box 180 of a check valve body 181. This check valve body 181 contains any suitable type of check valve, although it is preferred to use a ball and seat type with a spring, such as a ball 182 engaging a seat 183 in a flow passage 184 through said valve body 181 and this ball being held against said seat by a coiled spring 185. The lower end of said body 181 has a threaded box 186 into which is secrewed a short nipple 187, the lower end of which is connected to one leg of a T 188.

The third leg of said T 178 has a short nipple 189 threaded thereinto, the other end of which is connected into a threaded box 190 of a by-pass valve body 191 which has a flow passage 192 therethrough. The lower end of said body 191 has a clean-out plug 193 in its bottom and an upstanding, externally threaded pin or collar 194 on its upper end. This pin 194 receives an internally threaded box 195 on the lower end of an elongated, cylindrical collar or mandrel 196 and the upper end of this collar 196 has an externally screw-threaded pin 197 for receiving a threaded cap or crown 198. The flow passage 192 of the valve body 191 has a dividing partition or web 199 extending thereacross and the web is provided with a port 200 extending therethrough that is formed with an annular, ground seat 201 on its upper edge.

An annular, frusto-conical valve member 202 is adapted to engage said seat 201 and is formed on its upper edge with an upright, cylindrical stem 203, the upper end of which is threaded to engage within a flat guide washer or disc 204. This guide disc is provided with an annular, upturned guide flange or rim 205 for steadying said guide disc and holding said valve stem 203 and valve member 202 in alinement, whereby said valve member 202 will always engage said seat 201 when moved to its closed position.

A threaded stem or screw 207 extends axially of the upper portion of said collar 196 and an annular, ground valve member 208 is formed on said stem at the upper end of said threaded portion for co-acting and engaging with a ground, annular seat 209 formed on the underside of an axial port 210 provided in said cap 198. An upright pin 211 extends axially of said stem from said valve member 208 and the upper end of this pin 211 is formed to receive a hand wheel 212 and a locking nut 213 which clamps said wheel 212 to said pin 211, whereby upon the rotation of said wheel 212 to the right or the left, said threaded stem 207 will be rotated therewith.

A circular guide bushing 214 is slidably mounted within said collar 196 and threaded upon said stem 207. This bushing 214 has an elongate rib or T 215 extending longitudinally of its side for engaging within a longitudinally extending keyway 206 formed in the upper portion of the wall of said collar 196 to hold said bushing against rotation, whereby when said stem is rotated in either direction, said bushing will be moved up or down in accordance with the threads on said stem and the direction of rotation. A suitable coiled spring 206 is positioned within said collar 196 beneath said bushing 214 and rests upon said guide disc 204 for forming a flexible, resilient connection between said bushing and said guide disc. It will be seen that by this structure a suitable, adjustable, back pressure valve is formed which may be regulated to maintain any predetermined pressure in said passage 192 of said valve body 191 beneath said valve member 202. This body 191 is also provided with an internally screwthreaded box 217 similar to and diametrically opposite said box 190. This box 217 has one end of a pipe 218 threaded thereinto and the other end of which pipe extends to a second leg 219 of said T 188. The third leg 220 of said T has a pipe 221 connected thereinto and this pipe extends to one leg of a T 222.

The lower leg of the T 222 has a short nipple 223 threaded thereinto, the other end of which is connected to one leg of a T 224 and this nipple 223 has a manually operated, gate valve 225 connected therein intermediate its ends. This T 224 has a horizontally extending pipe 226 connected to one leg and a similar pipe 226' connected to its other leg. The pipe 226 extends to said lower cap 126 of said cylinder 125, and said pipe 226' extends to said lower cap 128 of said cylinder 127. The pipes 226' and 226 are connected to said caps 126 and 128 respectively, and preferably diametrically opposite where said pipes 162 and 162' are connected to said caps, although the location of the connections of said pipes in said caps is immaterial to the operation of said pistons in said cylinders.

The upper leg of said T 222 has a relatively short, upright nipple 227 connected thereinto and the upper end of this nipple is threaded into one leg of a T 228. The other two legs of this T 228 have connected thereto, horizontally extending pipes 229 and 229', similar to said pipes 226 and 226'. The pipe 229 extends to said bowl 117 on top of said cylinder 125 and said pipe 229' extends to said bowl 118 on top of said cylinder 127. The short nipple 227 has a manually operated, gate valve 230 connected intermediate its ends, which is similar to said gate valve 225. It will be noticed that this structure forms a manifold. Pressure fluid may flow from said pipe 221, into said T 222, through said nipple 223, into said pipes 226 and 226' and beneath said pistons 129 and 132; if said valve 225 is open and said valve 230 is closed. If said valve 225 is closed and said valve 230 is opened, pressure fluid may flow into said nipple 221, through said pipes 229 and 229' and on top of said pistons 129 and 132. The purpose of this manifold structure and said valves 225 and 230 will be described in detail later.

In Figures 19 and 20, it will be seen that said valve body member 167 in the lower end of said housing 166, has screwed into its upper side three pairs of upright, externally screw-threaded, stud bolts or posts 231, 231'; 232, 232'; and 233, 233'. The threaded bolts comprising each pair of ports are spaced equidistant from this respective vertical ports 171, 173 and 176; such as said posts 231 and 231' from said port 171, said posts 232 and 232' from said port 173, and said posts 233 and 233' from said port 176. All of said posts are secured to said body member 167 by a locking boss or head 333 made integral therewith and the foot of each post is screwed into said body member, so that when the boss 333 is tightened against the upper surface of said body 167, each post is securely and rigidly held thereon. Each pair of posts and the respective port therewith (Figures 19, 20, 24 and 25), constitute a separate valve in function and purpose, and while all three are similar in construction, I will describe only one valve in detail (Figure 20), which description will suffice for all.

The upper ends of said ports 231 and 231' are formed with upright, co-axial, reduced pins 235 having external screw-threads thereon. A diaphragm cap and piston chamber structure is mounted upon the upper end of said threaded posts 231 and 231' on said pins 235 and alined with said vertical port 171. This diaphragm and piston structure is very similar to that shown and used in my other forms of intermitters, such as my Patents No. 2,171,812, No. 2,202,462, No. 2,171,478, No. 2,245,003, and No. 2,245,005.

This structure consists of a concavo-convex, annular cap or head 236 having an outwardly directed flange 237 on its perimeter. The annular piston chamber or cylinder 238 has a similar flange 239 and these two flanges 237 and 239 are clamped together by a plurality of bolts 240 and nuts 241, as well as nuts 242 on the upper ends of said threaded pins 235 for gripping and clamping a diaphragm disc 243 therebetween. It is pointed out that a diaphragm actuating chamber 244 is formed upon said diaphragm 243 within said cap 236. This diaphragm is provided with an axial opening, so that the upper end of a piston rod 245 may extend therethrough, in order that said diaphragm and a flat, circular piston 246 may be securely connected together by a nut 247 engaging said threaded upper end of said piston rod 245 on the upper side of said diaphragm; whereby said diaphragm 243, said piston 246 and said piston rod 245 are tied together and move as a unitary structure.

It will be noticed in Figures 19 and 20, that intermediate the ends of said threaded bolts 231 and 231', an adjusting nut 248 is mounted on each bolt and these nuts support an oblong web or spring bracket 249, whereby upon the rotation of said nuts 248, said web may be raised or lowered as desired. A suitable coiled spring 250 is interposed between and bears against the upper surface of said web 249 and the lower surface of said piston 246, whereby an upward tension or thrust is placed or exerted upon said piston, said piston rod 245 and said diaphragm 243. Thus, it will be seen that by adjusting said nut 248, this tension is regulated and may be increased or decreased as is needed.

The lower end of said piston rod 245 depends within said vertical port 171 and a suitable stuffing box is provided for closing the upper end of said port 171 and packing around the lower end of said piston rod 245. This stuffing box may comprise a threaded nipple 251 having an axial opening 252 therethrough, the upper portion of which is counterbored to provide a packing area or chamber for a suitable packing medium 253 to be inserted therein. The usual follower block 254 rides upon the packing 253 and is engaged and actuated by a threaded cap 255 screwed upon the upper end of said nipple 251.

It will be seen in Figures 20 and 24, that said piston rod 245 is provided with an axial bore or passageway 256 extending entirely therethrough, so that fluid may flow through said piston rod from one end to the other. The lower portion of said piston rod 245 is counterbored at 257, so as to provide an entrance or admission chamber. A small, annular dart or foot piece 258 is positioned at the lower end of said piston rod and has a conical valve tip or face 259 on its lower side and an upstanding, short, cylindrical pin 260 on its upper side. This pin 260 has a loose fit within said counterbore 257 and the upper end of said pin abuts the lower edge of a small coil spring 261 which exerts a slight tension downwardly on said dart 258. A small hole or opening 262 is provided in the wall of said piston rod adjacent the lower end of said piston rod for providing additional communication between said counterbore 257 and the outside of said piston rod in said port 171. It will be seen that said port 171 is provided with an internal web or partition 263 into which is threaded a replaceable seat member or bushing 264, which has an axial port 265 extending therethrough and the upper end of said port is formed with a ground, tapered seat 266 to receive said conical valve face 259.

It is pointed out that when said pressure fluid from said pipe 164 enters said valve body member 167 through said vertical port 171, said pressure fluid has to flow into said longitudinal passageway 172 and through said port 265 of the replaceable seat member 264, whereby said pressure fluid will engage and lift said dart 258 against the tension of said spring 261, as well as lift to some extent said piston rod 245. Then, said pressure fluid will enter said counterbore 257 both through said hole 262 and around said pin 260 of said dart 258, flowing through said bore 256 of said piston rod and out the upper end thereof on top of said diaphragm 243. While said spring 250 tends to keep said port 265 open, the filling up of said chamber 244 in said cap 236 and a pipe 267 leading therefrom to a clock valve body D will build up a pressure on said diaphragm 243, which is of a sufficiently large area, whereby said piston rod will be moved downwardly onto its seat 266 to close said port 265, at whatever pressure it is desired to maintain in said chamber 244 of cap 236. Of course, the pressure maintained in said pipe 267, cap 236, bore 256, and port 171 above partition 263 is controlled by the adjusting of said nuts 249 on said posts 231 and 231' and will be a reduced pressure from that present in said longitudinal passageway 172 up to the lower end of said vertical port 173 and in said port 171 below said partition 263.

This first valve A is termed and serves the purpose of a regulator valve, because the pressure in said pipe 164 is always greater than that used and desired for operating said clock valve D, whereby said pressure fluid is reduced at this point to the pressure desired and a reserve of this fluid pressure is maintained. Upon any withdrawal, this reserve is replenished by a reduction of the pressure in said chamber 244 upon said diaphragm 243, so that said spring 250 will lift said piston rod 245 and open said port 265. It will be seen that said pipe 267, said cap 236, said bore 256, and said port 171 above said partition 263 are in communication and form a pressure fluid reservoir; so that upon withdrawal of pressure fluid from said pipe 267, the pressure within said chamber 244 of said cap 236 will also be reduced simultaneously, whereby said spring 250 lifts said piston 246, said piston rod 245 and said valve face 259 from said seat 266 for admitting more pressure fluid through said port 265. The pressure in said reservoir is again increased to the point where said diaphragm 243 forces said piston 246 and said piston rod 245 downwardly and closed said port 265, whereby a predetermined pressure may be maintained in said reservoir by adjusting the tension of said spring 250 by the rotation of said nuts 249 on said bolts 231 and 231'.

The second valve B on said body 167 is termed and serves the purpose of a motor or gate valve, as it controls the flow of pressure fluid from said passageway 172 through said port 173 into said passageway 175. It will be seen that the structure of valve B is very similar to valve A, with the exception that the piston rod 268 is solid and has a reduced portion 269 on its lower end which terminates in an enlarged foot piece or valve member 270. The action of valve B is also different in that the axial port 271 of the replaceable seat member 272 is larger in diameter than said port 265 of said seat member 264 of said valve A and is opened upon the downstroke or travel of said piston rod 268 and is closed upon the upstroke of said piston rod.

The third valve C is termed and serves the purpose of a release or control valve and this valve and port 176 are similar to said valve A and port 171 in structure and action, with the exception that the piston rod 273 is solid and terminates at its lower end in a conical tip or valve member 274 for engaging a valve seat 275 at the upper end of a port 276 of a replaceable seat member 277, similar to said seat member 264. This valve C closes said port 276 upon the downward travel of piston rod 273 and opens the same upon its upward travel. The upward and downward travel of said piston rod is caused by the accumulation of pressure fluid in a diaphragm cap 278 acting upon a diaphragm 279 against the tension of a coiled spring 280. When said piston rod 273 is in its upper position as shown in Figure 20, any fluid in said passageway 175 or said pipe 177 will flow through said port 276, into a longitudinally extending passageway 281, then into a transversely extending passageway 282 extending to said threaded port or bolt hole 169' for said stud bolt 168', from which it is led into the axial port or bore 283 of said stud bolt 168' from which it is vented to the atmosphere.

Whenever said valve B is opened, said valve C will be closed; that is, said piston rod 273 will be in its lower position and pressure fluid from said passageway 172 entering said port 173 and said passageway 175 will flow into and through said pipe 177 from which it will be led to said T 222. When said valve B has closed and said valve C is opened, said port 276 is opened so that the pressure fluid in said passageway 175, said pipe 177 and whichever side of the manifold is opened, depending upon the position of said valves 225 and 230, will bleed through said port 276, said passageways 281 and 282 and out of said bore 283 of said stud bolt 168'.

It is pointed out that whenever said valve B is opened, so that pressure fluid is introduced or admitted into said passageway 175, and said valve C is closed, the fluid entering said pipe 177, flows into said T 178, from which it enters said nipple 179, as well as said nipple 189. The fluid entering said valve body 191 from said nipple 189 will flow on top of said valve 202, which being closed will prevent passage of pressure fluid through said valve body 191 and said passageway 192. The pressure fluid introduced into said nipple 179 enters said check valve body 181 and said flow passage 184 therethrough forcing said ball 182 off its seat 183 against the tension of said spring 185, whereby said fluid may flow on through said valve body 181, into said nipple 187, through said T 188 and into said pipe 221. Of course, the pressure fluid will also enter said pipe 218 from said leg 219 of said T 188, so that the same pressure will be present in said pipe 218 and in said passage 192 of said bypass valve body 191 beneath said valve member 202, as is in said pipe 221. However, as the same pressure is above said valve as beneath, said valve 202 will not be actuated or lifted and the pressure fluid will flow through said pipe 221 to said T 222.

When said valve B has closed and said valve C has been opened, the pressure in said pipe 221 cannot flow back through said check valve 181 and must flow through said pipe 218 and said port 200 of said web 199 of said by-pass valve 191. The purpose of this adjustable by-pass valve 191 is that the pressure in said pipes 221 and 218 may be bled or reduced to whatever pressure it is desired to maintain therein without reducing the same to atmosphere upon each actuation of said release valve C, whereby a great saving in pressure fluid and time is obtained.

The piston rod 273 of said valve C has the major portion of its upper end externally screw-threaded (Figures 20 and 25) to engage in an elongated boss 285 formed on the underside of a flat, circular piston 286, similar to said piston 246. An elongated lock nut 287 is mounted on said threads of said piston rod 273 beneath said boss 285 to lock said piston and said piston rod together, and it is preferred that the lower end of this nut 287 extend below the normal operating position of the spring supporting web 249'. It will be seen in Figures 19, 20 and 25, that a short distance below the lower end of said nut 287, a knurled band or ring 288 is formed on said piston rod 273.

In order to change the operation of said release valve C from time controlled releasing to well fluid pressure releasing, the lock nut 287 is screwed downwardly until the lower end thereof is on a line with the upper edge of said knurled band 288, as will be seen in Figure 25, then said piston rod 273 and said lock nut 287 therewith are screwed upwardly into said boss 285, until the upper end of said lock nut abuts the lower end of said boss. The lower end of said piston rod 273 is formed with an internally threaded socket (not shown) for receiving the threaded pin on the upper end of an elongated, reduced pin 289, which has an upset head on its lower end forming a foot piece or valve member 290. The upper surface of this valve member has an annular valve face 291 ground thereon for engaging a ground seat 292 formed on the lower end of said bore or port 276 of said replaceable seat member 277. When said piston rod 273 is screwed upwardly into said boss 285, said valve member 290 on the lower end of said reduced stem 289 will be moved therewith, so that said valve face 291 has engaged said seat 292 at the lower end of said port or passage 276 of said replaceable seat member 277, whereby said passageway is now closed when said piston rod 273 is in its uppermost position (Figure 25). When said valve C is in this position and said valve B is opened, pressure fluid flowing from said passageway 172, through said passageway 271 and into said passageway 175 will flow into said pipe 177 to said pipe 221, as has been described, and will not be vented. Thus, it will be seen that now said valve C opens on its downstroke and closes on its upstroke.

When the flowing well fluid from the tubing string 41 reaches the surface of the well, it will flow through said sub 140 and said flow line pipes 142 and 141 to any suitable disposal (not shown). The flowing well fluid will also enter and/or exert a pressure through a pipe 293, one end of which is connected to a leg of a T 294 connected into said flow line 141. The other end of this pipe 293 is connected to a well fluid manifold 295 mounted on the upper end of said cap 278 of said release valve C to transmit the pressure of said well fluid to said diaphragm 279 within said cap 278 and depress the same and said piston rod 273. This downward travel of said piston rod (Figure 25) will move said valve face 291 from its seat 292 to open said passageway 276, whereby the pressure fluid in said passageway 175, said pipe 177 and said nipple 179 will escape through said passageways 276, 281 and 282, out of said bore 283 of said bolt 168' and vented to the atmosphere. The valve B has been closed before said valve C is actuated to release said pressure fluid from said passageway 175 and said pipe 177. The pressure fluid in said cylinders 125 and 127, either above or below said pistons 129 and 132, in said manifold pipes 223, 226 and 226', or in said manifold pipes 227, 229 and 229', said T 222, and said pipes 221 and 218 will be bled through said by-pass valve 191 and reduced to the predetermined pressure desired to be maintained therein.

As has been pointed out, a more or less constant pressure is supplied to said pipe 164 from said casing head 42, or said field line 156, or any other suitable source. The spring 250 of said regulator valve A is set so as to maintain a predetermined pressure within said reservoir and this pressure will also be present in said pipe 267, in a T 296 connected in said pipe 267, and in a pressure gauge 297 connected in said T, up to said clock or time operated valve D.

This clock valve D is preferably constructed of a rectangular block or valve body 298 having a vertical bore 299 extending therethrough. This bore extends downwardly through said block from the top thereof to the bottom and is threaded at each end for receiving a thimble or bushing 300 at its upper end and a coupling member 301 at its lower end. The coupling member 301 connects with said pipe 267 and is provided with an axial bore 302 extending therethrough, the upper end of which is threaded to receive a removable valve seat 303.

A laterally directed, horizontally extending opening or passageway 304 extends outwardly from said bore 299 of said valve body 298, intermediate the threaded portions of said bore and preferably just above the upper end of said removable seat 303. The outer end of said passageway 304 is also threaded to receive a short length of pipe 305. Thus, it will be seen that a passageway from said pipe 267 to said pipe 305 is provided through said valve body 298.

The thimble 300 at the upper end of said bore 299 is provided with an axial bore 306, the lower portion of which is counterbored at 307 and a small, cylindrical valve member or dart 308 is positioned within said counterbore 307. The lower end of the valve member 308 is pointed or tapered, so as to engage and seat upon said removable valve seat 303 for closing said passageway through said valve body 298, whereby the flow of fluid from said pipe 267, to said pipe 305, through said valve body may be controlled. It is pointed out that said valve member 308 may undergo a limited, sliding movement within said counterbore 307.

A thin valve rod or stem 309 extends downwardly through said bore 306 of said thimble 300 and the lower end of said stem 309 rests upon the upper end of said valve member 308, but has no fixed connection therewith. Manifestly, when said valve stem is moved downwardly, its lower end engaging the upper edge of said valve member 308, said valve member is moved downwardly, so that the conical point on its lower end engages said removable seat member 303 and closes said fluid passageway through said valve body 298. So long as said valve stem is held in its lowermost position, it will hold said valve member 308 in a seated position which positively prevents a flow of fluid from said pipe 267 and said bore 302 of said coupling member 301, into said bore 299 and said pipe 305. However, when the pressure on the upper end of said valve stem 309 is released or removed, the pressure of said fluid in said pipe 267 and said bore 302 of said coupling member 301 acting against the underside of said valve member 308, will move said member and said valve stem upwardly in said counterbore 307 and said bore 306 of said thimble 300 respectively. It is pointed out that the upward movement of this valve member will be limited, if not terminated sooner, by the upper end of said valve member engaging or striking the shoulder formed between said counterbore 307 and said bore 306, and as the upward movement of said valve member 308 ceases, the upward movement of said valve stem 309 will also be terminated.

For controlling the operation of said valve stem 309 to regulate the seating and unseating of said valve member 308, said valve stem has its upper end contacting the underside of a knurled head 310 of an adjustable stop bolt 311, but has no fixed connection therewith. This bolt is threaded through the underside of a horizontally extending lever 312 and lock nut 313 is screwed onto the upper end of said bolt 311 above the lever 312 to lock said bolt in its adjusted position. This lever 312 has one end curved downwardly and pivoted to said valve body 298 on a pivot pin or bolt 314, so that said lever extends upwardly from one corner of said valve body 298 and overhangs the same.

In Figures 19, 22 and 23, it is pointed out that due to the pivotal mounting of said lever 312, the same tends to swing downwardly at all times and is supported only by said valve stem 309 and said valve member 308, whereby the weight of said lever and its attachments is imposed upon said valve stem and said valve member to hold said member in its seated position. In order for said lever 312 to be lifted, the pressure of the fluid below said valve member must be sufficient to lift said lever and its attachments; although, it is true that said valve member and said stem exert or transmit the lifting action of said pressure fluid at a spaced point from said pivot pin 314, or the fulcrum of said lever, and this spacing to some extent facilitates the lifting of said lever.

An operating crank or curved finger 315 is pivoted at one end to an ear or lug 316 depending from the underside of said lever 312. The outer end of said finger 315 is upturned and slotted to form a bifurcated yoke in which a small roller 317 is so mounted that it is free to revolve therein. It will be noticed in Figures 19, 22 and 23, that said roller rides on the periphery of a suitable escapement or revolvable wheel 318, which has one or more notches 319 cut or formed in its circumference. This escapement wheel is mounted on a shaft 320 extending from a suitable housing 321 containing a time or clock mechanism (not shown) for driving said shaft 320 and said wheel 318. This wheel revolves in a counterclockwise direction (Figures 19, 22 and 23) and said roller 317 rides on the periphery of said wheel 318, so that when said wheel has revolved and one of said notches 319 has come over said roller; the same is free to enter said notch, due to the pressure of said pressure fluid beneath said valve member 308, as will be described later.

The outer end of said lever 312 is provided with a depending bolt or pin 322 which extends through a slot (not shown) in said finger 315 and the lower end of this pin 322 is threaded to receive a knurled nut 323. A small, coiled spring 324 is mounted on said pin 322 between said nut 323 and the underside of said finger 315, so as to exert a lifting action on said finger. The tension of said spring 324 may be regulated by the rotation of said knurled nut 323, whereby said finger and said lever are so connected together as to co-act and form a flexible connection from said roller 317 to the upper end of said valve stem 309. The flexibility or rigidity of this connection, thus formed, may be regulated by the tension placed on said spring 324 by said knurled nut 323. Thereby, when one of said notches 319 is above said roller 317, said pressure fluid beneath said valve member 308 will lift said valve member, said valve stem 309, said lever 312, said finger 315 and said roller 317, until said roller engages the bottom of said notch, which terminates the upward movement or travel of said parts and roller. However, said roller may drop slightly from contact with the bottom of said notch, depending upon the setting of said clock valve D, as will be described later.

It is pointed out that when the actuation of said valve C is time controlled, said valve C is actuated at a lower pressure than is required to actuate said valve B (Figures 19 and 20), so that when said valve member 308 has been moved upwardly to open the passageway through said valve body 298; the pressure fluid from said pipe 267 entering said pipe 305 will flow into a T 325. One leg of this T 325 is connected by a short length of pipe 326 to the cap 327 of said valve B, and the other leg of said T is connected by a short length of pipe 328 to the upper end of a pet cock 329. The lower end of this pet cock 329 is threaded into the upper side of said fluid manifold 295, which in turn is threaded into the upper end of said cap 278 of said valve C.

When said release valve C is time actuated, said pet cock is in an open position, as shown in Figure 20, and said piston rod has been screwed out of said boss 285, until a line or shallow groove 330, formed on said piston rod, is on a line with the lower end of said lock nut 287, as is shown in Figures 19 and 20. With said valve C in this position, the pressure fluid from said pipe 305 will not only enter said T 325, said pipe 326, said diaphragm cap 327 of said valve B and said pipe 328, but will also flow through said pet cock 329, said manifold 295 and into said cap 278 of said valve C on top of said diaphragm 279. The piston rod 273 of said valve C will be moved downwardly, so that said valve face 274 will engage the seat at the upper end of said passageway 276 and close the same, before said piston rod 268 of said valve B is moved downwardly to open said passageway 271. The pressure fluid from said passageway 172 may now flow through said passageway 271, into said passageway 175 and into said pipe 177. It will be apparent, that this clock valve D regulates the entire actuation of said valves B and C, which makes them completely time operated valves. The regulating mechanism of said clock valve D is the knurled bolt 311 and its lock nut 313 threaded through said lever 312.

The finger 315 has a short, upstanding lug 331 on its upper surface near said pin 322 and spaced from said lug 316 for engaging the underside of said lever 312. Attention is directed to Figures 22 and 23, wherein it will be seen that there is a small space between the upper end of said lug 331 and the underside of said lever 312. The amount of space between said lug and said lever is regulated by said bolt 311 and this space, together with the adjustment of said bolt 311 controls the length of time said valve member 308 remains open; as well as the length of time said valves B and C are actuated and then released or returned to their normal positions.

Whenever the adjustment of said regulator valve A is changed, so that a greater or lesser pressure is carried in said reservoir, as set out above, said bolt 311 and spring 324 have to be adjusted in accordance, to regulate the tension of said roller 317 on said wheel 318. This bolt 311 and spring 324 take care of any slight inaccuracies or irregularities in said wheel 318, in said shaft 320, or in the timing mechanism (not shown) in said housing 321 driving said shaft.

The longitudinal adjustment of said bolt 311 and the amount of space between said lug 331 and said lever 312, controls the depth to which said roller 317 enters one of said notches 319 in said timing or escapement wheel 318 before said lug engages said lever 312 to lift the same. As soon as said lug 331 engages said lever, or substantially so, to reduce the tension held on said lever, the pressure fluid beneath said valve member 308 will lift said valve member, said valve stem 309, said lever 312 and said roller 317, whereby said pressure fluid will flow from said pipe 267, through said pipes 326 and 328, to said motor valve B and said release valve C.

When said roller 317 has entered said notch 319 to the point where said lug 331 engages said lever 312, (Figure 22), by the dotted line position X of said roller; the opening of said valve member 308 begins and this valve member will remain open while said roller completes its entrance into said notch, until the bottom of said notch is reached. However, said roller may immediately fall away from the bottom of said notch a short distance, or it may ride the bottom or inclined surface of said notch, or it may fall to approximately the same point X in its upward travel at which said valve member was opened. In any event, the revolving of said wheel 318 will engage the inclined side of said notch 319 with said roller, so that said roller will ride on said inclined side and be carried up and out of said notch onto the perimeter of said wheel. As soon as said roller reaches the point illustrated, by the dotted line position Y on said inclined surface, where said lug 331 engaged said lever 312, or released the tension and said valve member 308 was opened in the upward travel of said roller, said valve member will be closed and said lug will move away from said lever to substantially its original spacing. If said roller is not out of said notch when this point Y is reached, said roller will continue riding up the inclined surface of said notch, until it reaches the periphery of said wheel.

In the illustration shown by the dotted lines in Figure 22, the space in said inclined surface illustrated by the dotted positions of said roller from Y to T would be for spreading the spacing of said lug 331 from said lever 312 to its original setting. It is pointed out that the depth to which said roller 317 may enter said notch before said valve member 308 is opened, may be controlled and this point may be anywhere from the very bottom of said notch, as shown by dotted line position S, to just within said notch, such as is illustrated by the position Z. Of course, this adjustment of said bolt 311 to obtain this variance is very slight, as the difference in the various possible positions is only a matter of seconds, depending on the speed said wheel 318 is revolved by the timing mechanism (not shown) in said housing 321. The reason for the various positions is to regulate the length of time said valve member 308 is open.

The valves B and C are actuated to move their respective piston rods 268 and 273 downwardly when said valve member 308 is opened and are held in this position, as long as said valve member is open. Thus, the regulating of the length of time said valve member is open, will control the opening and closing of said valves B and C. The length of time said valve member is open depends on the depth that said roller enters said notch before said valve member is opened, because said valve member 308 is closed when said roller reaches the same depth in said notch at which it opened said valve member. By adjusting said bolt 311 to increase or decrease the space between said lug 331 and said lever 312, the depth to which said roller enters said notch before actuation of said lever is easily regulated and the length of time said piston rods 268 and 273 of said motor valve B and said release valve C respectively are held in their lowermost or open positions is controlled.

When said valve member 308 has been closed, the pressure fluid trapped in said caps 327 and 278, said pipes 305, 326 and 328, said T 325, said pet cock 329 and said fluid manifold 295 up to its cut-off valve 340, will bleed or leak around said valve stem 309 and through said bore 306 of said thimble 300 and escape to the atmosphere. This bleeding of the trapped pressure fluid will permit said piston rods 268 and 273 to be lifted by said spring 250' of said valve B and said spring 289 of said valve C. Due to the different tension placed on said springs 250' and 280, said piston rod 268 of said motor valve B will be moved upwardly first and close said passageway 271, and then, said piston rod 273 of said release valve C will be moved upwardly and open said passageway 276. When this occurs, the pressure fluid trapped in said passageway 175 and said pipes 177 and 221 will be reduced to the pressure it is desired to maintain in said pipes 221 and 218, by the setting of the by-pass valve 191. This excess pressure from all of the pressure fluid in said passageway 175, said pipe 177 and nipples 189 and 179 will be vented through said passageways 276, 281 and 282 to the atmosphere through the bore 283 of said stud bolt 168'.

As has already been pointed out (Figures 20 and 24), said port 171 above said bushing 263, said counterbore 257, said bore 256 of said piston rod 245, said chamber 244 of said cap 236 of said regulator valve A, said pipe 267, said T 296, said bore 302 of said coupling member 301 and the bore of said replaceable seat member 303 to the lower end of said valve member 308 form a pressure fluid reservoir, which will be filled with a predetermined pressure that is regulated by the tension placed on said spring 250 by said nuts 248 on said bolts 231 and 231'. When the clock mechanism (not shown) in said housing 321 drives said shaft 320 for revolving said wheel 318 in a counter-clockwise direction and one of said notches 319 comes over said roller 317, the pressure of fluid in said reservoir beneath said valve member 308 will then lift said valve member, said valve stem 309 and said lever 312, so that said roller will enter said notch. Thus, it will be seen that in this position, the pressure fluid in said reservoir is free to flow into said pipe 305, said T 325, said pipe 326, said cap 327, said pipe 328 and into said cap 278 of said valve C. This pressure fluid in said cap 278 will act on said diaphragm 279 and move said piston 286 and said piston rod 273 downwardly against the tension of said coiled spring 280, so as to seat the valve face 274 in the seat at the upper end of said passageway 276 of said bushing 277 and close said passageway. This pressure fluid will also flow from said T into said cap 327 of said valve B, where the diaphragm 243' will be actuated upon by the pressure fluid in said cap and move said piston 246' and said piston rod 268 downwardly to open said passageway 271.

Due to the difference in the spring tension of said valves B and C, said release valve C will be actuated to close said passageway 276 before said motor valve B is actuated to open said passageway 271. The opening of said passageway 271 will permit the flow of pressure fluid from said passageway 172 into said passageway 175 and said pipe 177. However, the pressure of the fluid in said diaphragm actuating chamber 244 of said regulator valve A and said reservoir first will be reduced by way of flow through said valve body 298 from said pipe 267, which reduction will open said regulator valve A to replenish and build up the pressure of said pressure fluid reserve. Any reduction in pressure in said reservoir will permit said spring 250 to lift said piston rod 245, and the pressure fluid in said passageway 172, said pipe 164, said port 171 beneath said web 263 and in said passageway 265 of said replaceable seat bushing 264 will unseat said conical tip 259 from its seat 256, so that additional pressure fluid may then flow from said pipe 164 into said reservoir to maintain the predetermined pressure desired therein.

When it is desired to change said release valve C from time actuation to fluid pressure release actuation, said pet cock 329 is closed, as shown in Figure 25, and said lock nut 287 is screwed downwardly on said piston rod 273, so that the lower end thereof is moved downwardly from said line or groove 330 even with the upper edge of said knurled bank 288 on said piston rod. This piston rod is then rotated and screwed up into said boss 285, preferably by using said knurled band 288 as a wrench surface, until the upper end of said lock nut 287 again abuts the lower end of said boss 285. As will be noticed, the foot piece 290 and its valve face 291 has been brought into contact with and seated in the seat 292 at the lower end of said passageway 276 of said replaceable seat bushing 277. By this change or adjustment, said release valve C now opens said passageway 276 on the downward travel of said piston rod 273 and closes the same upon the upward travel thereof.

When said valve member 308 has been opened, as shown in Figure 23, the pressure fluid flowing through said valve body 298 will not enter said cap 278 of said valve C, because said pet cock 329 is closed. However, said pressure fluid will enter said pipe 326 and said cap 327 of said motor valve B and exert a pressure on said diaphragm 243' to actuate said piston 246' and said piston rod 268 to open said passageway 271 of said replaceable seat bushing 272. Pressure fluid will flow from said passageway 172, through said passageway 271, into said passageway 175, through said pipe 177, into said check valve body 181 and through said pipe 221 to said T 222 to be distributed by said manifold in accordance with the setting of said valves 225 and 230, as will be described later.

When the well fluid reaches the surface of the well, it will enter the flow sub 140 from which it will flow into the flexible connection 142, through said T 294 and into the regular flow line 141. The well fluid flowing through said flow lines 142 and 141 will partially flow into and exert a pressure in said by-pass line 293, the gate valve 340 being open, and into said flow manifold 295. This pressure, so exerted, will be transmitted to said diaphragm 279 in said cap 278 of said release valve C. The motor valve B in the meanwhile has been closed, due to the bleeding of the pressure fluid from said cap 327 and said pipes 326, 328 and 305, out of said bore 306 around said valve stem 309 to the atmosphere.

The exertion of a pressure on said diaphragm 279 of said valve C will move said piston rod 273 downwardly and carry said valve face 291 away from its seat 292 and the lower end of said passageway 276. Thereby, the pressure fluid trapped in said passageway 175, said pipe 177 and said nipples 179 and 189 will be vented to the atmosphere through said passageways 281 and 282 and said bore 283 of said stud bolt 168'. The pressure fluid trapped in said pipes 218 and 221, said T 222 and said manifold pipe will be reduced, in accordance with the setting of said by-pass valve 191 and this excess pressure fluid will be vented, as described for the fluid in said passageway 175. The venting of this pressure fluid is thus controlled by the flow of the well fluid through said flow lines 141 and 142. The intermittent control mechanism is now ready for the clock mechanism to bring another notch over said roller 317.

In operation, when said tubing string 41 has been run or lowered in said casing 40 of a well and the pin on the upper end of said tubing string has been connected to said collar 50 on the lower end of said tubular polish rod 47, the upper end of said polish rod is connected to said central member 137 of said cross-arms 135, 136, 147 and 148. As has been pointed out, said tubing string 41 is made up in accordance with the well conditions and any number of kick-off valves 52 may be made up therein, and usually one or more of the type of kick-off or flow valves 71 are used and a bottom hole valve 78 and 84 may be installed. The well conditions and flow requirements determine the number and type of kick-off and flow valves used and their arrangement, whereby any combination of valves necessary to satisfactorily handle the well may be had and the invention is not to be limited to any particular arrangement or number of valves used. I prefer for the purpose of illustration to show said tubing string, as made up with one of each type of valves.

When the packer 53 has been set and the upper end of the tubing 41 connected to said polish rod 47, which in turn is connected to said central boss 137, said gate valve 157 in said pressure fluid supply line 156 is opened. This pressure fluid will flow into said casing head 42 and into said casing 40 to fill said casing 40 with the same pressure as is in said line 156. The valve 160 is also opened, so that pressure fluid may flow through said pipe 159, to said T 159' and into said pipes 162 and 162'. It will be seen that these pipes are connected to said caps 126 and 128 at the lower end of said cylinders 125 and 127, whereby pressure fluid may flow into said cylinders beneath said pistons 129 and 132. Sufficient pressure fluid is introduced into said cylinders beneath said pistons to lift said pistons to a position approximately medially of their stroke or travel in said cylinders and this position is their neutral or inoperative position, because said tubing string being suspended from said cross-arms will hold said valves 52, 71, 78 and 84 in a closed position. When the pressure fluid admitted beneath said pistons from said pipes 162 and 162' has lifted said pistons to their central position, which closes all of said valves, said valve 160 is closed, which traps the pressure fluid in said cylinders 125 and 127 beneath said pistons 129 and 132 to hold said pistons in this central position. This trapped pressure fluid serves as a cushioning means, as well as to return said pistons to their central positions whenever they are moved downwardly from this position. The well and the actuator therefor is now ready to be operated.

The gate valve 225 of said manifold structure for said actuator, as shown in Figures 1, 5, 9 and 16, was already closed and said gate valve 230 is now opened, as well as said gate valve 165 of said flow line 164 leading to said intermitter housing 166, so that pressure fluid may be supplied to said port 171 of said valve body 167. This pressure fluid will flow into said passageway 172, through said passageway 265 of said replaceable seat bushing 264 and into the upper portion of said passageway 171, whereby said reservoir will be supplied with pressure fluid, as has been described, and the desired pressure will be maintained in said reservoir in accordance with the setting of said spring 250.

When said intermittent control mechanism is set for time actuation and said clock valve D opens to permit the flow of pressure fluid from said pipe 267 to said pipe 305, said valve C will be closed and said valve B will be opened, whereby pressure fluid may flow from said passageway 172, into said passageway 175 and through said pipe 177. This pressure fluid will flow into said T 178, through said nipple 189 and into said by-pass valve body 191 above said partition 199, as well as through said nipple 179, into said flow passage 184 of said check valve body 181, through said T 187, into said pipe 218, and through said pipe 221 to said T 222. The valve 225 already being closed and said valve 230 being opened, the pressure fluid from said T 222 will flow through said nipple 227, into said T 228 and through said pipes 229 and 229'. Inasmuch as these pipes are connected to said supporting bowls 117 ad 118 of said cylinders 125 and 127 respectively, this pressure fluid will be introduced into said cylinders on top of said pistons 129 and 132 therein. As soon as sufficient pressure has been built up above said pistons, which will be greater than the pressure supporting said pistons, the same are forced downwardly. This downward forcing or travel of said pistons will move said tubing string 41 downwardly, through the medium of said piston rods 123 and 124, said cross-arms 135 and 136, said polish rod 47 to the approximate position, as shown in Figures 1, 2, 3 and 4.

However, the downward travel of said pistons and said tubing string is limited by the setting of the lower hand wheels 151' and 152' and these wheels may be set so that only the uppermost kick-off valve 52 (Figure 2) may be opened while the remaining kick-off valves, if used, are closed, and if the valve 71 is used, it also will be closed. If said hand wheels are so set that only the upper kick-off valve 52 will open upon the downward travel of said pistons and said tubing string, the lifting fluid within said casing 40 will enter the perforations 63 and flow through said pin 61 around said mandrel 70, into said counterbore 59 of said collar 54, through said perforations 69 of the upset portion 67' of said mandrel 70, into the bore of said mandrel and of said tubing string to cut off and lift the well fluid therein. This well fluid will flow through said tubular polish rod 47, said sub 140, said flexible connection 142 and said flow line 141.

While the pressure fluid is being admitted into said tubing string and lifting the well fluid therein, the timing mechanism (not shown) is revolving said wheel 318 so that said roller 317 may ride on the inclined surface of said notch 319 to the point where, in its dropping into said notch, said valve member was opened, and when this point in its outward travel is reached, said valve member 308 of said clock valve D will be held against its seat in the port of said replaceable seat bushing 303. Further flow of pressure fluid from said pipe 267 to said pipe 305 is now prevented and the pressure in said pipes 305, 326 and 328 and in said caps 327 and 278 will leak or bleed around said valve stem 309 and escape to the atmosphere. This bleeding and escape will reduce the pressure on said diaphragms 243' and 279, and due to the setting of the springs 250' and 280, the valve B will close before the valve C.

After said release valve C has opened, the pressure in said passageway 175 and said pipe 177 and said nipples 189 and 179 will be vented to the atmosphere. The pressure in said cylinders 125 and 127 on top of said pistons 129 and 132, in said pipes 229, 221 and 218 will be reduced to whatever back pressure the by-pass valve 191 has been set to maintain therein. This reduction of pressure in said cylinders is sufficient to permit the pressure trapped and compressed beneath said pistons to lift said pistons and said tubing string back to their original position, which is the closed position of said valves, and particularly in this instance, the uppermost flow valve 52. Of course, the upper set of hand wheels 151 and 152 will be engaged by the ears 149 and 150 to limit this upward travel of said pistons.

After this uppermost valve has been operated several times and the well does not produce sufficient fluid to maintain the operation or production of well fluid from this point in the well, said hand wheels 151' and 152' are lowered slightly so that said valve 71 may be operated upon the next downward stroke or travel of said tubing string, whereby lifting fluid from said casing may flow through said perforations 63', through the bore of said pin 61', into the counterbore 59' of said collar 54' and into said tubing string section 41'. It will be seen that now the well fluid will be lifted in said tubing string 41 from the valve 71, which is at a lower point in said well for producing and lifting said well fluid. Of course, lifting fluid will still be admitted to said valve 52 and this additional admittance will assist in the lifting of said well fluid.

To operate the bottom hole valve 78 and 84, the pistons are returned to their central or inoperative position and the lower pair of hand wheels 151' and 152' are run up on said threaded screws 145 and 146 until the underside of said ears 149 and 150 are engaged, as shown in Figure 16. The upper pair of hand wheels 151 and 152 now are screwed upon said threaded bolts 145 and 146 to form an upper stop for the upper travel of said cross-arms 135, 136, 147 and 148. The gate valve 230 is now closed while the gate valve 225 is opened. The desired back pressure is regulated by rotating said hand wheel 212 of said by-pass valve 191 to tighten or loosen the tension on said spring 206 thereof, in order to maintain the required back pressure, although this adjustment depends entirely upon the weight of the tubing and the various surrounding well conditions.

When said clock valve D now operates, the pressure fluid introduced into pipe 221 will flow into the manifold pipes 226 and 226' and beneath said pistons 129 and 132 to lift said pistons. The lifting of said tubing string 41 will also lift said valves 52 and 71 and the upper portion 78 of the bottom hole valve 84, so that said mandrel 81 and said valve member 91 will be lifted off its seat 90 and open the passageway through said pin 85, whereby lifting fluid in said casing string 40 above said packer 53 may now enter the perforations 89, the bore of said pin 85, said distributing chamber 92, said flow passageway 93 extending through said valve body 84, through said mandrel 100 of said packer 53 and into the upper end of said chamber 101 on top of the well fluid accumulated either in said chamber or in said mandrel 100 and this admittance of lifting fluid will exert a downward pressure on said fluid. This exertion of lifting fluid will force said well fluid up through said tubing section 41″ and all of the well fluid above the lower end of said tubing section 41″ in said chamber 101 will be forced into said tubing section and the tubing string thereabove. As soon as the lifting fluid has lowered the well fluid level to the lower end of said tubing section 41‴, said lifting fluid will enter said section and lift said well fluid up through said tubing string 41 and out thereof into said flow line 141.

As soon as said clock valve D has closed and the pressure on said diaphragms 243' and 279 of said valves B and C has bled to the point where said valve B is closed and said valve C is opened, said pressure fluid in said cylinders 125 and 127 beneath said pistons 129 and 132 will be reduced, in order that said pistons may return to their central or inoperative position to close said valve 84. Of course, further downward travel of said pistons and cross-arms will be prevented by the trapped pressure fluid beneath said pistons, as well as said hand wheels 151' and 152'. It is pointed out that upon each operation of said valve D, said bottom hole valve 84 will be actuated.

In Figures 9, 10, 11 and 12, I have shown a well installation wherein pressure differential or automatic type valves are mounted above the bottom hole valve 84. However, it is practical to use automatic valves as shown together with kick-off valves 52 and 71, or any other combination suitable for the purpose and required to accomplish the particular lifting or production problem. This pressure differential or automatic valve consists of an upper elongated coupling collar 341 and a lower coupling collar 342 connected together by a short length of tubing or mandrel 343, so as to space said collars at any desired or predetermined distance. Each collar is provided with an internally screw-threaded box 344, for receiving the externally screw-threaded pin 345, one on each end of the connecting length of tubing 343. The upper collar 341 is formed with an internally screw-threaded box 346, for receiving an externally screw-threaded pin 347, depending from the tubing string 41, and the lower collar 342 is formed with a similar box 348, for receiving a similar pin 349 extending upwardly from said tubing string, whereby said valve or valves may be readily connected in said tubing string.

The upper collar 341 is provided medially of its length with a horizontally extending duct or passage 350. A vertical, upwardly extending duct or passageway 351 is drilled in said collar and terminates short of the passage 350, but is connected thereto by a short, axial passageway or port 352. The passageway 351 forms a cylinder or housing for a cylindrical valve member 353 having a conical point or tip on its upper end for engaging within the axial port 352, so as to close the same when said valve member is in its uppermost position. This valve member is provided with a depending rod or stem 354, which is formed with an externally screw-threaded pin on its lower end, so as to engage in the upper side of an upset head 355 of a guide rod 356. An elongated, tubular weight 357 is loosely mounted on said valve stem 354 and rests upon the upset head 355. The lower portion of the guide rod 356 slides within a vertically extending guideway 358 in the lower collar 342. The weight 357 may be of any desired number of pounds, as the variance of the number of pounds of said weight assists in the control of the operation of said automatic valve.

In operating this form of valve, the pressure fluid in the annular space of said casing string 40 surrounding the tubing strong 41 enters the valve and tubing string through the passageway 351, the port 352, and the duct 350. If there should be no fluid in the uppermost automatic valve, the velocity of the flow of lifting fluid through said passageway 351 and port 352 will draw the valve member 353 upwardly, so that the conical tip thereof will enter the port 352 and close the same, whereby the flow of lifting fluid into said valve is terminated and the lifting fluid acts to hold said valve member closed. The next lower valve will then be operated and as the well fluid builds up in said tubing string above the duct 350, the weight of the column of fluid exerts a downward pressure on said valve member 353, and when the well fluid has risen sufficiently within said tubing string to overcome the pressure of the lifting fluid beneath said valve member, the pressure of the column of well fluid will open this valve member. When this occurs, the lifting fluid will enter said tubing string and aerate or lift the column of well fluid and consequently, lift the well fluid up and out of said tubing. As soon as sufficient well fluid has been removed to reduce the weight or downward pressure on said valve member to a predetermined amount, the velocity of said lifting fluid entering the passageway 351 and port 352 will increase until said valve member is again drawn onto its seat and closes said port.

Figures 10, 11, 12:
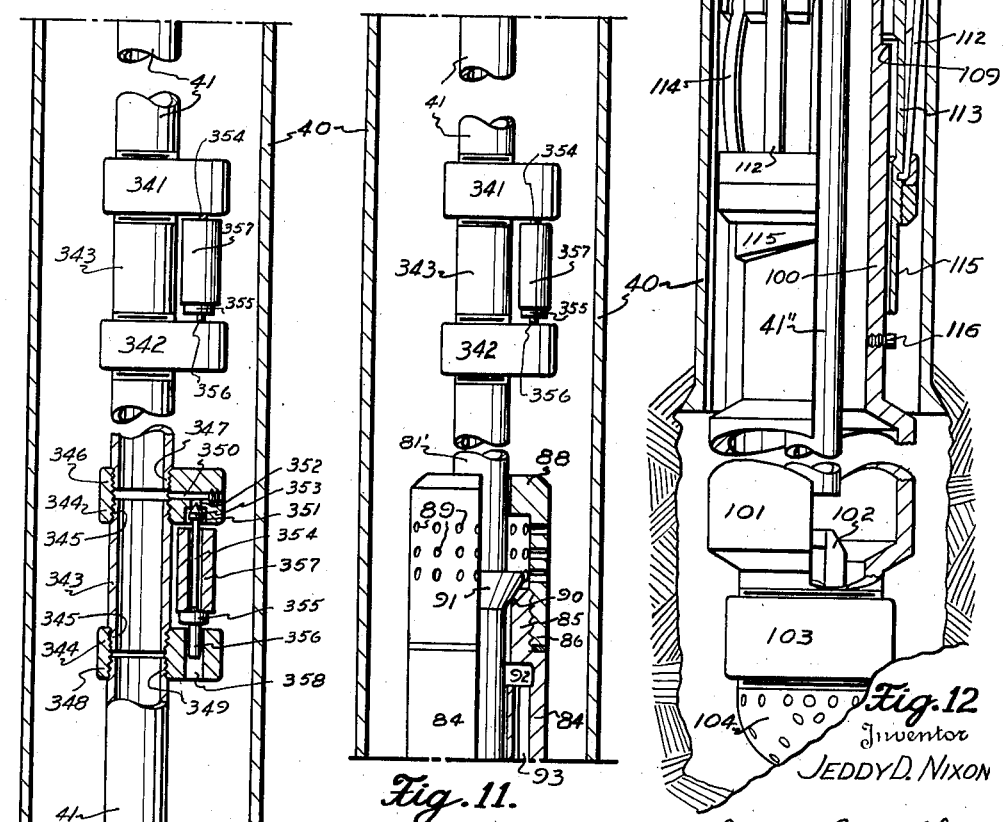
Figure 10 is a continuation of Figure 9, illustrating how a pressure differential operated type of valve may be used with the invention.
Figure 11 is a view, partly in section and partly in elevation, and is a continuation of Figure 10.
Figure 12 is a similar view and is a continuation of Figure 11.

It will be noticed in Figure 10, that said weight 357 is loosely mounted on said valve stem 354, so as to be readily removed and replaced. This loose mounting of said weight permits a free action of said stem and said valve member 353, whereby the flow of lifting fluid through said passageway 351 may readily close or move said valve member to its seated position.

It will be seen in Figure 10, that when said valve member opens, it will drop only a short distance, as the upset head 355 will engage the upper surface of the lower coupling collar 342. Therefore, the valve member 353 will never drop down and out of said passageway 351. It is impossible for said valve member to pound against the shoulder between the passageway 351 and said port 352, due to the loose mounting of said weight 357 on said valve stem 354. Should said weight leave said head 355, the upper travel of said weight will be terminated by its upper end engaging the lower surface of said upper collar 341. Therefore, none of the inertia of said weight will be transmitted to said valve member to cause pounding of said valve member on said seat with the result of excessive wear and damage to the same, whereby a longer life of said valve member and seat is assured. The guide stem 356 serves to keep the valve member in alinement with said passageway 351, and provides for free and easy operation thereof at all times.

It is further pointed out that the weight 357 is susceptible of variation, since a heavier or a lighter weight may be readily placed on said valve stem 354. The heavier weight will cause said valve member 353 to open quicker so as to discharge the well fluid more often by requiring less weight or a shorter column of well fluid to affect opening of said valve member, while a lighter weight will require more weight or a longer column of well fluid to open said valve member, with the result of less frequent discharge of well fluid. Thus, it will be observed that by increasing or decreasing the amount of the weight 357, the opening and the closing of said valve member 353 may be controlled, and the timing of the operation of said valve may be thus predetermined.

The timing mechanism in said housing 166 and pressure actuator is not used for operating said pressure differential type of valves and should an installation be made such as is shown in Figures 9, 10, 11 and 12, the surface control mechanism will be set into operation whenever it is desired to operate said bottom hole valve 84 and when this occurs, the operation of the surface control mechanism is the same as has already been described.

Various changes, alterations and modifications may be made in the size, shape and arrangement of the herein described elements, within the scope of the appended claims.

What I claim and desire to secure by Letters Patent is:

1. In a well, a movable tubing string in the well, an operating apparatus for the tubing string including, a supporting member for the upper end of said tubing, a pair of cylinders adjacent the upper end of said tubing, a piston mounted in each cylinder having a piston rod extending therefrom which is connected to the supporting member for said tubing, whereby when said pistons are moved in said cylinders said tubing will be moved therewith, an inlet valve connected to the tubing and operated by the movement thereof to admit a lifting fluid to the tubing to lift well fluid therethrough, adjustable stops for limiting and controlling the travel of said supporting member, a manifold connected to said cylinders to control the operation of said pistons therein, a time controlled mechanism connected to said manifolds for controlling the flow of an actuating fluid in the manifold to control the operation of said pistons to regulate the movement of said tubing, and an adjustable release valve connected to said control mechanism for maintaining a predetermined back pressure in said manifold and said cylinders.

2. In a well, a movable tubing string in the well, an operating apparatus for the tubing string including, a supporting member for the upper end of said tubing, a pair of cylinders adjacent the upper end of said tubing, a piston mounted in each cylinder having a piston rod extending therefrom which is connected to the supporting member for said tubing, whereby when said pistons are moved in said cylinders said tubing will be moved therewith, adjustable stops for limiting and controlling the travel of said supporting member, a manifold connected to said cylinders to control the operation of said pistons therein, a time controlled mechanism connected to said manifold for controlling the flow of an actuating fluid in the manifold to control the operation of said pistons to regulate the movement of said tubing, an adjustable release valve connected to said control mechanism for maintaining a predetermined back pressure in said manifold and said cylinders, a telescoping valve connected in said tubing and adapted to be opened upon vertical travel of said tubing in one direction and closed upon travel in the opposite direction, and a second valve connected in said tubing adapted to be opened upon further travel of said tubing to the closing of said first-named valve and to be closed upon a partial opposite travel of said tubing.

3. A system of flowing wells which includes, a supply of lifting fluid, a conductor for said lifting fluid, a single string of tubing mounted in the conductor for conveying the well fluid to the surface, a valve mounted in the tubing for controlling the supply of lifting fluid to the well fluid for each lifting operation, means for vertically moving said tubing to actuate said valve, and time controlled means for controlling and timing the intervals of movement of said tubing moving means to control the period of admission of lifting fluid to said well fluid to lift the same up and out of said tubing, said time controlled means also terminatng the admission of lifting fluid to said tubing.

4. A system of flowing wells which includes, a well casing, a supply of lifting fluid in said casing, a single string of tubing in said casing for conducting well fluid out of the well, a valve mounted in said tubing for controlling the supply of lifting fluid to the well fluid for each lifting operation to lift the well fluid up out of said tubing, fluid pressure operated means connected to said tubing for vertically moving said tubing to actuate said valve to open and close the same to admit or terminate the admission of lifting fluid to said tubing, and time controlled means for controlling the flow of a pressure fluid to said pressure fluid operated means for controlling and timing the intervals of movement of said tubing to control the period of admission of lifting fluid to said tubing to lift said well fluid up and out of said tubing, said time controlled means also terminating the admission of lifting fluid to said tubing.

5. A system of flowing wells which includes, a well casing, a supply of lifting fluid in said casing, a single string of tubing in said casing for conducting well fluid out of the well, a valve mounted in said tubing for controlling the supply of lifting fluid to the well fluid for each lifting operation to lift the well fluid up and out of said tubing, fluid pressure operated means connected to said tubing for vertically moving said tubing to actuate said valve to open and close the same to admit or terminate the admission of lifting fluid to said tubing, time controlled means for controlling the flow of a pressure fluid to said pressure fluid operated means for controlling and timing the intervals of movement of said tubing to control the period of admission of lifting fluid to said tubing to lift said well fluid up and out of said tubing, said time controlled means also terminating the admission of lifting fluid to said tubing, and adjustable means connected to said time controlled means for regulating the escape of pressure fluid from said pressure fluid operated means in order to maintain a predetermined back pressure in said pressure fluid operated means to prevent complete bleeding of pressure fluid from said means.

6. In a well flowing apparatus the combination of, a tubing string including, a plurality of independently movable sections, inlet valves connecting said tubing sections and including closure elements attached to adjacent tubing sections, whereby said valves are opened and closed upon longitudinal movement of one section with relation to an adjacent section, one of the inlet valves adapted to be opened upon further travel of said tubing to the closing of another valve and to be closed upon a partial opposite travel of said tubing, fluid pressure operated means at the top of the well for moving said tubing string longitudinally, and time controlled means for controlling and timing the supply of pressure fluid to said operating means, whereby the length of time any inlet valve is held open may be regulated as well as the length of time said valve is closed.

7. In a well flowing apparatus the combination of, a tubing string including, a plurality of independently movable sections, a plurality of inlet valves connecting said tubing sections and including closure elements attached to adjacent tubing sections, whereby said valves are opened and closed upon longitudinal movement of one section with relation to an adjacent section, one of the inlet valves adapted to be opened upon further travel of said tubing to the closing of another valve and to be closed upon a partial opposite travel of said tubing, fluid pressure operated means at the top of the well for moving said tubing string longitudinally to selectively open and close any one of the inlet valves, and time controlled means for controlling and timing the supply of pressure fluid to said operating means, whereby the length of time any inlet valve is held open may be regulated as well as the length of time said valve is held closed.

8. In the system of flowing wells wherein a supply of lifting fluid is maintained in the well under working pressure, a single string of well fluid conducting tubing mounted in the well, a valve connected with said tubing for controlling the flow of lifting fluid from said supply into said tubing, means connected to the tubing for accumulating a body of well fluid, whereby the well fluid may flow into said tubing, the improvement which includes, time controlled mechanically operated means at the top of the well for vertically moving said tubing to open and close said valve to admit lifting fluid to the body of accumulated well fluid to continuously lift said body of well fluid in the tubing to the top thereof and to control the duration of the lifting fluid admission period.

9. In the system of flowing wells wherein a supply of lifting fluid is maintained in the well under working pressure, a single string of well fluid conducting tubing having vertically movable sections mounted in the well, lifting fluid inlet valves connected with these sections and actuated thereby for controlling the flow of lifting fluid from said supply into said tubing, means connected to said tubing for accumulating a body of well fluid, whereby the well fluid may flow into the tubing, the improvement which includes, time controlled mechanically operated means at the top of the well for vertically moving said tubing sections to open and close any one of said valves both to admit lifting fluid to the body of accumulated well fluid and to control the duration of the lifting fluid admission period, said valves being opened for a period to admit sufficient lifting fluid to said tubing to continuously lift said body of well fluid in the tubing to the top thereof.

10. In the system of flowing wells wherein a supply of lifting fluid is maintained in the well under working pressure, a single string of well fluid conducting tubing mounted in the well, a valve connected with said tubing for controlling the flow of lifting fluid from said supply into said tubing, means connected to said tubing for accumulating a body of well fluid, whereby the well fluid may flow into said tubing, the improvement which includes, mechanically operated means at the top of the well for vertically moving said tubing to open and close said valve both to admit lifting fluid to the body of accumulated well fluid and to control the duration of the lifting fluid admission period, said valve being opened for a period to admit sufficient lifting fluid to continuously lift said body of well fluid in the tubing to the top thereof, and time controlled means for controlling the operation of said mechanically operated means for regulating the intervals of movement of said tubing.

11. In the system of flowing wells wherein a supply of lifting fluid is maintained in the well under working pressure, a single string of well fluid conducting tubing mounted in the well, a valve connected with said tubing for controlling the flow of lifting fluid from said supply into said tubing, means connected to said tubing for accumulating a body of well fluid, whereby the well fluid may flow into said tubing, the improvement which includes, time controlled mechanically operated means at the top of the well for vertically moving said tubing to open and close said valve both to admit lifting fluid to the body of accumulated well fluid and to control the duration of the lifting fluid admission period, said valve being opened for a period to admit sufficient lifting fluid to continuously lift said body of well fluid in the tubing to the top thereof, and a pressure-differential operated valve connected in said tubing for admitting fluid to said tubing.

12. In the system of flowing wells wherein a supply of lifting fluid is maintained in the well under working pressure, a single string of well fluid conducting tubing mounted in the well, a valve connected with said tubing for controlling the flow of lifting fluid from said supply into said tubing, means connected to said tubing for accumulating a body of well fluid, whereby the well fluid may flow into said tubing, a second valve connected with said tubing for controlling the flow of lifting fluid from said supply to said accumulated body of well fluid, the improvement which includes, time controlled mechanically operated means at the top of the well for vertically moving said tubing to open and close said valves both to admit lifting fluid to said tubing and/or to said body of accumulated well fluid and to control the duration of the lifting fluid admission period, either of said valves being opened for a period to admit sufficient lifting fluid to continuously lift said body of well fluid in the tubing to the top thereof.

13. In the system of flowing wells wherein a supply of lifting fluid is maintained in the well under working pressure, a single string of well fluid conducting tubing mounted in the well, a valve connected with said tubing for controlling the flow of lifting fluid from said supply into said tubing, a chamber connected to said tubing for accumulating a body of well fluid, whereby the well fluid may be displaced into said tubing, a packer connected with said tubing for packing off said chamber for accumulating the body of well fluid, the improvement which includes, time controlled mechanically operated means at the top of the well for vertically moving said tubing to open and close said valve both to admit lifting fluid to the body of accumulated well fluid in said chamber and to control the duration of the lifting fluid admission period, said valve being opened for a period to admit sufficient lifting fluid to continuously lift said body of well fluid in the tubing to the top thereof.

14. The system of flowing wells which includes, means for providing a supply of lifting fluid, means for accumulating a body of well fluid, means for segregating the body of well fluid from the supplying of lifting fluid, valve means controlling the supply of lifting fluid to the well fluid, means for operating said valve and conducting the well fluid when impelled by the lifting fluid by means of a single string of tubing through the tubing to the well surface, mechanical means for moving the tubing vertically to open and close said valve, and time controlled means for controlling and timing the operation of said mechanical means, whereby the length of time said tubing is held in one position before it is moved to another may be regulated.

15. In a well flowing apparatus wherein a single string of tubing is mounted in the usual casing in which latter is stored a volume of lifting fluid under pressure, the combination of an inlet valve connected with and operated by the tubing, means connected to said tubing for accumulating a well fluid, a conductor for delivering lifting fluid from said valve to the well fluid which has accumulated in the well to lift said well fluid in said tubing to the well surface, mechanically operated means at the top of the well connected to the tubing for raising and lowering the same to operate said valve, and time controlled means for controlling and timing the operation of the mechanical means, whereby the length of time said mechanical means is operated may be regulated.

16. In a well flowing apparatus wherein a single string of tubing is mounted in the usual casing in which the latter is stored a volume of lifting fluid under pressure, the combination of an inlet valve connected with and operated by the tubing, means connected to said tubing for accumulating a well fluid, a conductor for delivering lifting fluid from said valve to the well fluid which has accumulated in the well to lift said well fluid in said tubing to the well surface when said valve is open, fluid pressure operated means at the top of the well connected to the tubing for raising and lowering the same to operate said valve to open and close said valve, and time controlled means for controlling and timing the supply of pressure fluid to said operating means, whereby the length of time pressure fluid is supplied may be regulated.

17. In a well flowing apparatus wherein a single string of tubing is mounted in the usual casing in which latter is stored a volume of lifting fluid under pressure, the combination of an inlet valve connected with and operated by the tubing, means connected to said tubing for accumulating a well fluid, a conductor for delivering lifting fluid from said valve to the well fluid which has accumulated in the well to lift said well fluid in said tubing when said valve is open to the well surface, fluid pressure operated means at the top of the well connected to the tubing for raising and lowering the same to operate said valve to open and close said valve, and time controlled means for controlling and timing the supply of pressure fluid to said operating means, whereby the length of time pressure fluid is supplied may be regulated.

18. In a well, a movable tubing string in the well, an operating apparatus for the tubing string including, a supporting member for the upper end of said tubing, a pair of cylinders adjacent the upper end of said tubing, a piston mounted in each cylinder having a piston rod extending therefrom which is connected to the supporting member for said tubing, whereby when said pistons are moved in said cylinders said tubing will be moved therewith, adjustable stops for limiting and controlling the travel of said supporting member, a manifold connected to said cylinders to supply pressure fluid for the operation of said pistons therein, an inlet valve connected to the tubing and operated by the movement thereof to admit lifting fluid to the tubing to lift well fluid therethrough to the well surface, and time controlled means for controlling and timing the flow of pressure fluid through the manifold to regulate the movement of the pistons in the cylinders, whereby the opening and closing of the inlet valve may be regulated.

19. In an operating apparatus for a movable tubing string in a well including, a supporting member for the upper end of said tubing, a pair of cylinders adjacent the upper end of said tubing, a piston mounted in each cylinder having a piston rod extending therefrom which is connected to the supporting member for said tubing, whereby when said pistons are moved in said cylinders said tubing will be moved therewith, an inlet valve connected to the tubing and operated by the movement thereof to admit a lifting fluid to the tubing to lift well fluid therethrough to the well surface, adjustable stops for limiting and controlling the travel of said supporting member, a manifold connected to said cylinders to supply pressure fluid for the operation of said pistons therein, a time controlled mechanism connected to said manifold for controlling the flow of an actuating fluid in the manifold to control the operation of said pistons to regulate the movement of said tubing, whereby the operation of said pistons may be regulated to control the opening and closing of the inlet valve, and an adjustable by-pass valve connected to said control mechanism for bleeding pressure fluid from said manifold and said cylinders to maintain a predetermined back pressure in said manifold and said cylinders.

20. In combination with a well tubing mounted in a well, an operating apparatus for moving the tubing string including, a supporting member for the upper end of said tubing, a pair of cylinders adjacent the upper end of said tubing, a piston mounted in each cylinder having a piston rod extending therefrom that is connected to the supporting member for said tubing, whereby when said pistons are moved in said cylinders said tubing will be moved therewith, adjustable stops for limiting and controlling the travel of said supporting member, a manifold connected to said cylinders to supply pressure fluid for the operation of said pistons therein, a time controlled mechanism connected to said manifold for controlling the flow of an actuating fluid in the manifold to control the operation of said pistons to regulate the movement of said tubing may be regulated and time controlled, an adjustable by-pass valve connected to said control mechanism for bleeding the pressure from said manifold and said cylinders to maintain a predetermined back pressure in said manifold and said cylinders to maintain a predetermined back pressure in said manifold and said cylinders, a telescoping valve connected in said tubing and adapted to be opened upon vertical travel of said tubing in one direction and closed upon travel in the opposite direction, and a second valve connected in said tubing adapted to be opened upon further travel of said tubing to the closing of said first-named valve and to be closed upon a partial opposite travel of said tubing.

JEDDY D. NIXON.